US012542343B2

(12) United States Patent
Kondaveeti et al.

(10) Patent No.: US 12,542,343 B2
(45) Date of Patent: Feb. 3, 2026

(54) MOUNTING BRACKETS FOR MOUNTING MULTIPLE ANTENNAS TO A MONOPOLE AND RELATED ASSEMBLIES

(71) Applicant: Outdoor Wireless Networks LLC, Claremont, NC (US)

(72) Inventors: Karthik Kondaveeti, Piduguralla (IN); YiDing Wang, Suzhou (CN); PuLiang Tang, Suzhou (CN)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 0 days.

(21) Appl. No.: 18/514,155

(22) Filed: Nov. 20, 2023

(65) Prior Publication Data

US 2024/0178543 A1 May 30, 2024

Related U.S. Application Data

(60) Provisional application No. 63/487,957, filed on Mar. 2, 2023.

(30) Foreign Application Priority Data

Nov. 25, 2022 (IN) ............................ 202241067859

(51) Int. Cl.
*H01Q 1/12* (2006.01)

(52) U.S. Cl.
CPC ......... *H01Q 1/1228* (2013.01); *H01Q 1/1264* (2013.01)

(58) Field of Classification Search
CPC .. H01Q 1/1228; H01Q 1/1264; H01Q 1/1242; H01Q 1/1207; H01Q 1/12; H01Q 1/246; H01Q 3/04; A47B 57/26
(Continued)

(56) References Cited

U.S. PATENT DOCUMENTS

| | | | | |
|---|---|---|---|---|
| 6,222,504 B1 * | 4/2001 | Oby | H01Q 3/04 343/890 |
| 11,387,538 B2 * | 7/2022 | Liu | H01Q 1/1228 |

(Continued)

FOREIGN PATENT DOCUMENTS

| | | |
|---|---|---|
| CN | 217086858 U | 7/2022 |
| CN | 116646709 A | 8/2023 |

*Primary Examiner* — Ingrid M Weinhold
(74) *Attorney, Agent, or Firm* — Myers Bigel, P.A.

(57) ABSTRACT

The present application is directed to a mounting bracket for an antenna. The mounting bracket includes a base plate having first and second arms and a spine spanning the first and second arms, the first and second arms and spine creating a monopole receiving space. First, second and third flanges merge with and extend downwardly from, respectively, the first arm, the second arm, and the spine, each of the first, second and third flanges including first and second radially-outwardly extending ears. The mounting bracket also includes a clamp including first and second jaws, each of the first and second jaws having upper and lower plates spanned by a backbone. The clamp further includes first and second elongate threaded members that extend between the backbones of the first and second jaws. Each of the first and second jaws is attached to each of the first and second arms via fasteners inserted through apertures in the first and second arms. Alternative mounting brackets and related assemblies are also described.

20 Claims, 25 Drawing Sheets

(58) Field of Classification Search
USPC .......................................................... 248/218.4
See application file for complete search history.

(56) References Cited

U.S. PATENT DOCUMENTS

| | | | | |
|---|---|---|---|---|
| 12,244,056 | B2 * | 3/2025 | Yang | H01Q 1/1264 |
| 2015/0115117 | A1 * | 4/2015 | Mummert | H01Q 1/1207 248/218.4 |
| 2020/0185827 | A1 * | 6/2020 | Kaistha | H01Q 1/1228 |
| 2020/0321679 | A1 * | 10/2020 | Liu | H01Q 1/1228 |
| 2021/0066779 | A1 * | 3/2021 | Udagave | H01Q 3/06 |
| 2021/0075083 | A1 * | 3/2021 | Udagave | F16M 13/022 |
| 2023/0327326 | A1 * | 10/2023 | Yang | H01Q 1/246 |
| 2024/0145897 | A1 * | 5/2024 | Towne | H01Q 1/1228 |
| 2024/0213650 | A1 * | 6/2024 | Wang | H01Q 1/246 |
| 2024/0339752 | A1 * | 10/2024 | Liu | H01Q 1/246 |
| 2024/0396201 | A1 * | 11/2024 | Modak | H01Q 1/1228 |

* cited by examiner

MOUNTING BRACKETS FOR MOUNTING MULTIPLE ANTENNAS TO A MONOPOLE AND RELATED ASSEMBLIES

RELATED APPLICATIONS

The present application claims priority from and the benefit of Indian Patent Application No. 202241067859, filed Nov. 25, 2022, and U.S. Provisional Patent Application Ser. No. 63/487,957, filed Mar. 2, 2023, the disclosures of which are hereby incorporated herein in their entireties.

FIELD

The present invention is directed generally to the mounting of antennas, and in particular to the mounting of wireless antennas.

BACKGROUND

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." In one common configuration, a hexagonally-shaped cell is divided into three 120° sectors in the azimuth plane, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In a tri-sector antenna arrangement such as that described above, brackets are typically used to mount each antenna to the raised structure. Typically, each antenna is mounted with its own set of two or more mounting brackets. It may be desirable to provide alternative mounting arrangements, particularly for smaller antennas that are mounted to monopoles.

SUMMARY

As a first aspect, embodiments of the present invention are directed to a mounting bracket for an antenna. The mounting bracket includes a base plate having first and second arms and a spine spanning the first and second arms, the first and second arms and spine creating a monopole receiving space. First, second and third flanges merge with and extend downwardly from, respectively, the first arm, the second arm, and the spine, each of the first, second and third flanges including first and second radially-outwardly extending ears. The mounting bracket further includes a clamp having first and second jaws, each of the first and second jaws having upper and lower plates spanned by a backbone, the clamp further having first and second elongate threaded members that extend between the backbones of the first and second jaws. Each of the first and second jaws is attached to each of the first and second arms via fasteners inserted through apertures in the first and second arms.

As a second aspect, embodiments of the present invention are directed to the mounting bracket described above in combination with first, second and third antennas mounted to, respectively, the first and second cars of the first, second and third flanges.

As a third aspect, embodiments of the present invention are directed to the mounting bracket and antennas as described above in further combination with a monopole, with the first and second jaws engaging the monopole.

As a fourth aspect, embodiments of the present invention are directed to a mounting bracket for an antenna. The mounting bracket includes a base clamp including a plurality of apertures, and two adjustable clamps. Each adjustable clamp has a plurality of apertures and are pivotably coupled to the base clamp at one end via a respective fastener received through aligned apertures in the base clamp and in the adjustable clamp and configured to be secured to the other adjustable clamp at an opposing end. The base clamp and two adjustable clamps define a receiving space for a monopole, and the receiving space is adjustable to accommodate different sized monopoles.

As a fifth aspect, embodiments of the present invention are directed to a method of securing a mounting bracket for an antenna to a monopole. The method includes providing a mounting bracket having a base clamp including a plurality of apertures and two adjustable clamps pivotably coupled to the base clamp about respective pivot points via a respective fastener, the base clamp and two adjustable clamps define a receiving space for a monopole; pivoting the adjustable clamps away from each other to an open position; inserting the monopole into the receiving space of the mounting bracket; pivoting the adjustable clamps toward each other to a closed position with the monopole captured within the receiving space of the mounting bracket; and securing the adjustable clamps together via a fastener to secure the mounting bracket to the monopole.

As a sixth aspect, embodiments of the present invention are directed to the mounting bracket described above in combination with first, second and third antennas mounted to, respectively, the base clamp and two adjustable clamps.

As a seventh aspect, embodiments of the present invention are directed to the mounting bracket and antennas as described above in further combination with a monopole, with the monopole captured within the receiving space and engaged by the base clamp and two adjustable clamps.

As an eighth aspect, embodiments of the present invention are directed to a mounting bracket for an antenna. The mounting bracket includes a base clamp including a plurality of slots having indentations, and two adjustable clamps. Each adjustable clamp has a plurality of apertures and are pivotably coupled to the base clamp at one end via a respective fastener received through aligned slots in the base clamp and apertures in the adjustable clamp and configured to be secured to the other adjustable clamp at an opposing end. The base clamp and two adjustable clamps define a receiving space for a monopole, and the receiving space is adjustable to accommodate different sized monopoles.

As a nineth aspect, embodiments of the present invention are directed to the mounting bracket described above in combination with first, second and third antennas mounted to, respectively, the base clamp and two adjustable clamps.

As a tenth aspect, embodiments of the present invention are directed to the mounting bracket and antennas as described above in further combination with a monopole, with the monopole captured within the receiving space and engaged by the base clamp and two adjustable clamps.

As an eleventh aspect, embodiments of the present invention are directed to a mounting bracket for an antenna. The mounting bracket includes a base member having two legs that are coupled together at one end by an upper plate, each leg having an elongated slot; a first adjustment plate and a second adjustment plate pivotably coupled to the upper plate of the base member, each adjustment plate has a plurality of apertures; and a clamping member movably coupled to the base member via a fasteners received through the elongated slots in the legs, the base member and the clamping member define a receiving space for a monopole. The receiving space is adjustable to accommodate different sized monopoles, the first adjustment plate, the second adjustment plate and the clamping member are configured such that an antenna can be mounted thereon, and the adjustment plates are configured to pivot relative to the base member to position a mounted antenna at a desired angle.

As a twelfth aspect, embodiments of the present invention are directed to the mounting bracket described above in combination with first, second and third antennas mounted to, respectively, to first and second adjustment plates and the clamping member.

As a thirteenth aspect, embodiments of the present invention are directed to the mounting bracket and antennas as described above in further combination with a monopole, with the monopole captured within the receiving space and engaged by the base member and the clamping member.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim, accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
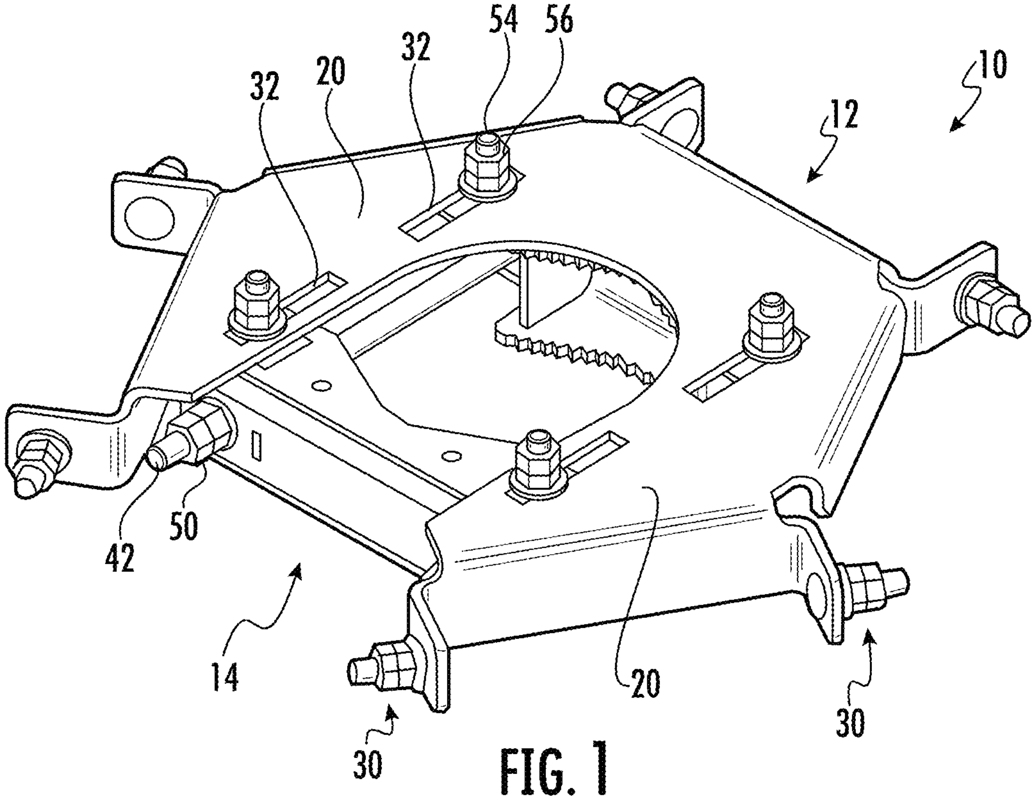
FIG. 1 is a front perspective view of an antenna mounting bracket according to embodiments of the present invention.

The present invention is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
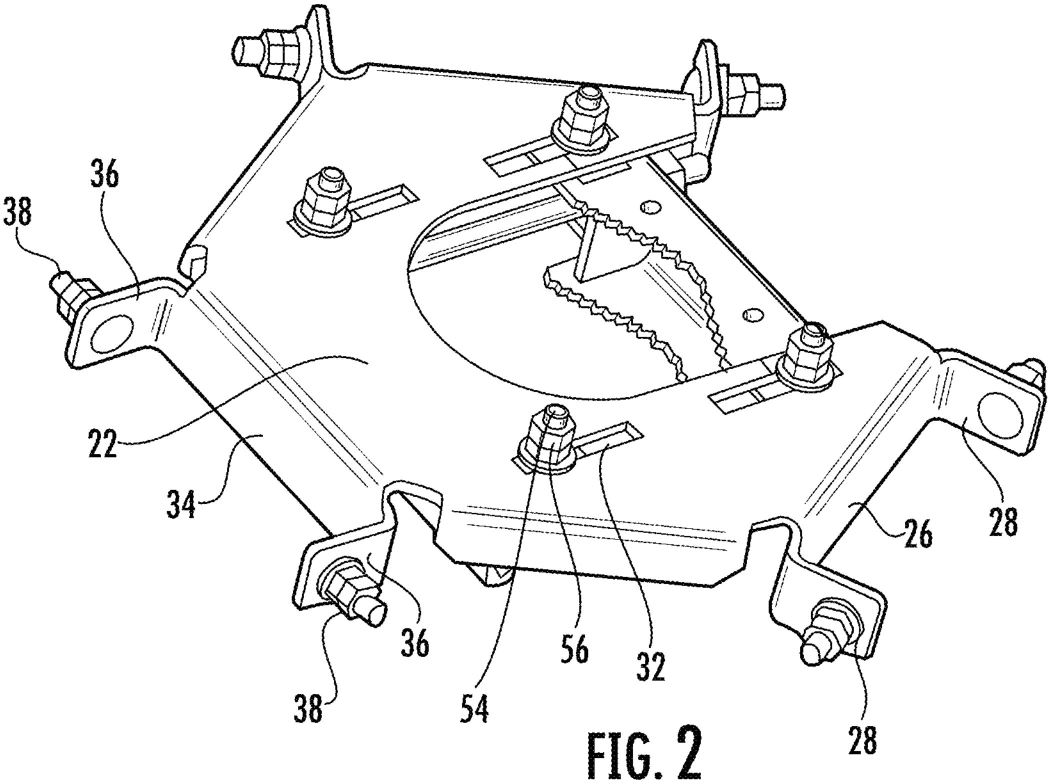
FIG. 2 is a rear perspective view of the mounting bracket of FIG. 1.

Referring now to the figures, a mounting bracket, designated broadly at 10, is shown in FIGS. 1 and 2. The mounting bracket 10 includes a generally-C shaped base plate 12 and a clamp 14. These structures are described in greater detail below.

Figure 3:
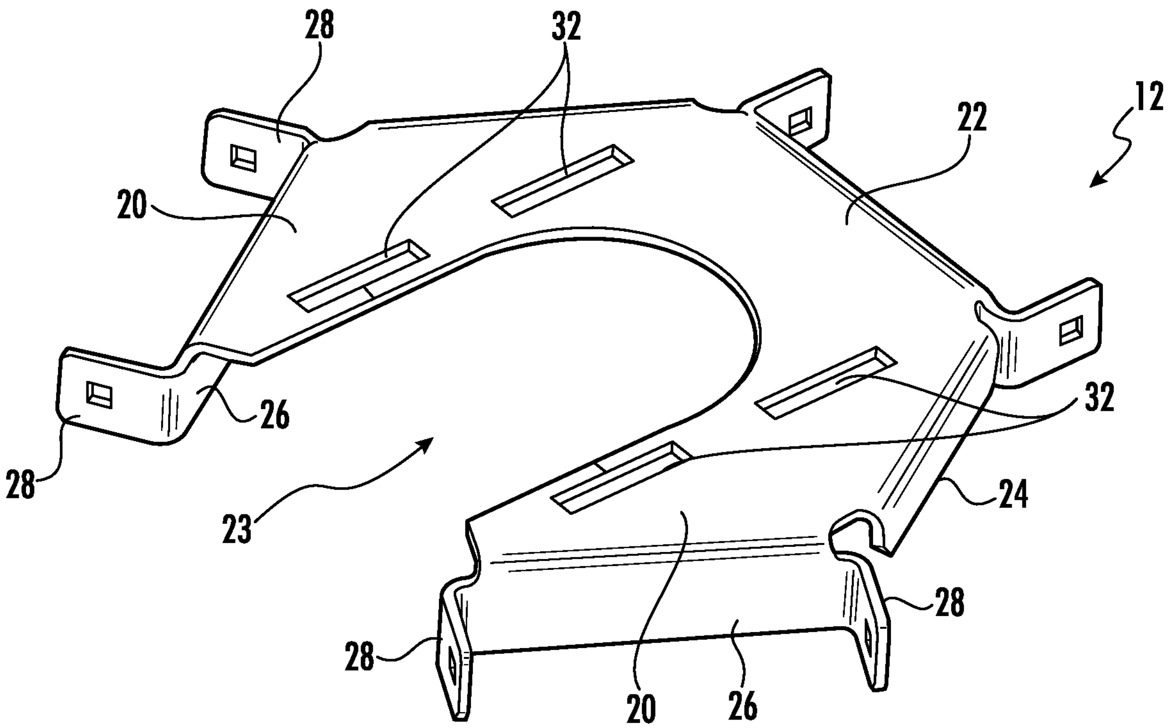
FIG. 3 is a front perspective view of the base plate of the mounting bracket of FIG. 1.
Figure 4:
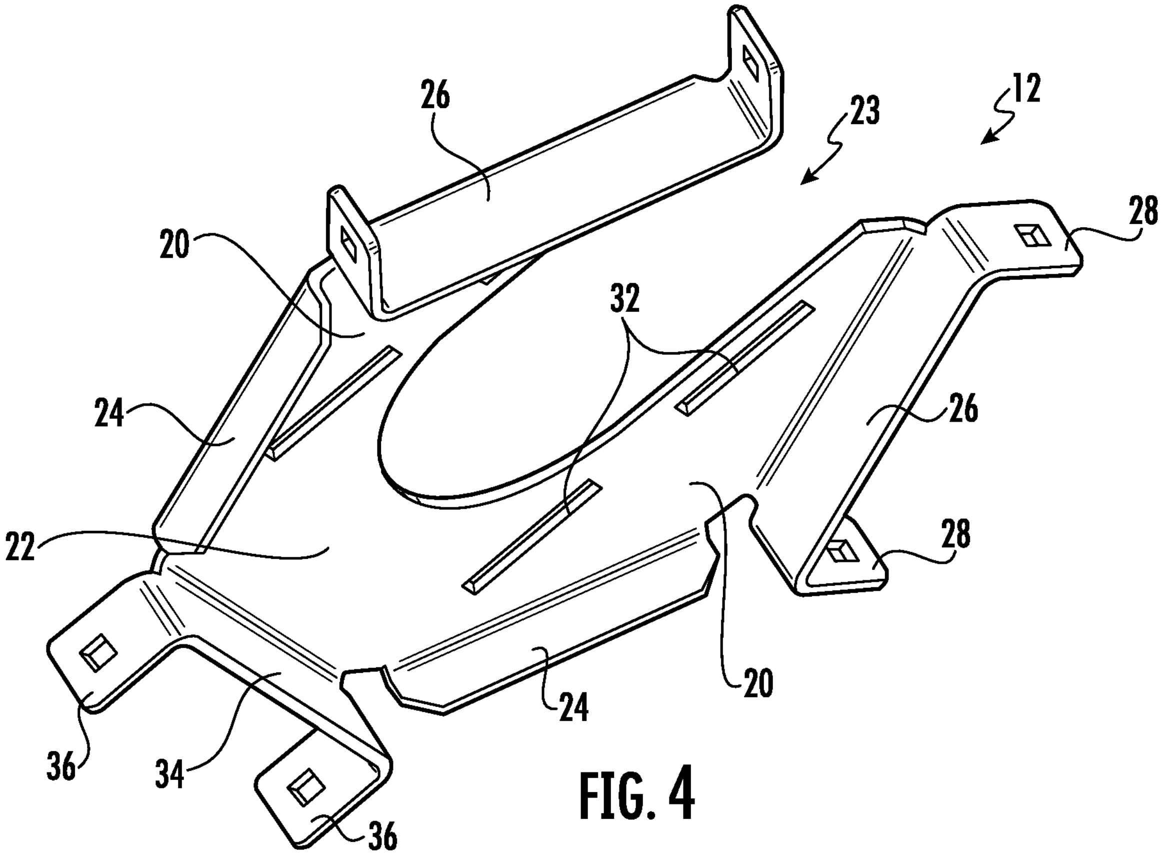
FIG. 4 is a bottom perspective view of the base plate of FIG. 3.

Referring now to FIGS. 3 and 4, the base plate 12 has two legs 20 that are connected at one end by a spine 22 to create a monopole receiving space 23. Each of the legs 20 is generally an elongated triangle. One edge of each leg 20 has a short flange 24 that extends downwardly. A second edge of each leg 20 includes a longer flange 26 that also extends downwardly, but includes two cars 28 that extend radially outwardly from each end of the flange 26. Holes for receiving nuts and bolts 30 (FIG. 1) are present in each car 28. Each leg 20 also includes two slots 32. The slots 32 are collinear and are positioned radially inwardly from the flanges 24, 26.

The spine 22 extends between the rear ends of the legs 20. A flange 34 extends downwardly from the outward edge of the spine 22. Like the flanges 26, the flange 34 have two cars 36 that extend radially outward from each end of the flange 34. Holes for receiving nuts and bolts 38 are present in the cars 36 (FIG. 2).

It should be noted that the two flanges 26 and the flange 34 are spaced substantially circumferentially equidistant from each other. As a result, antennas mounted to each of the flanges 26, 34 are separated from each other by approximately 120 degrees.

Figure 5:
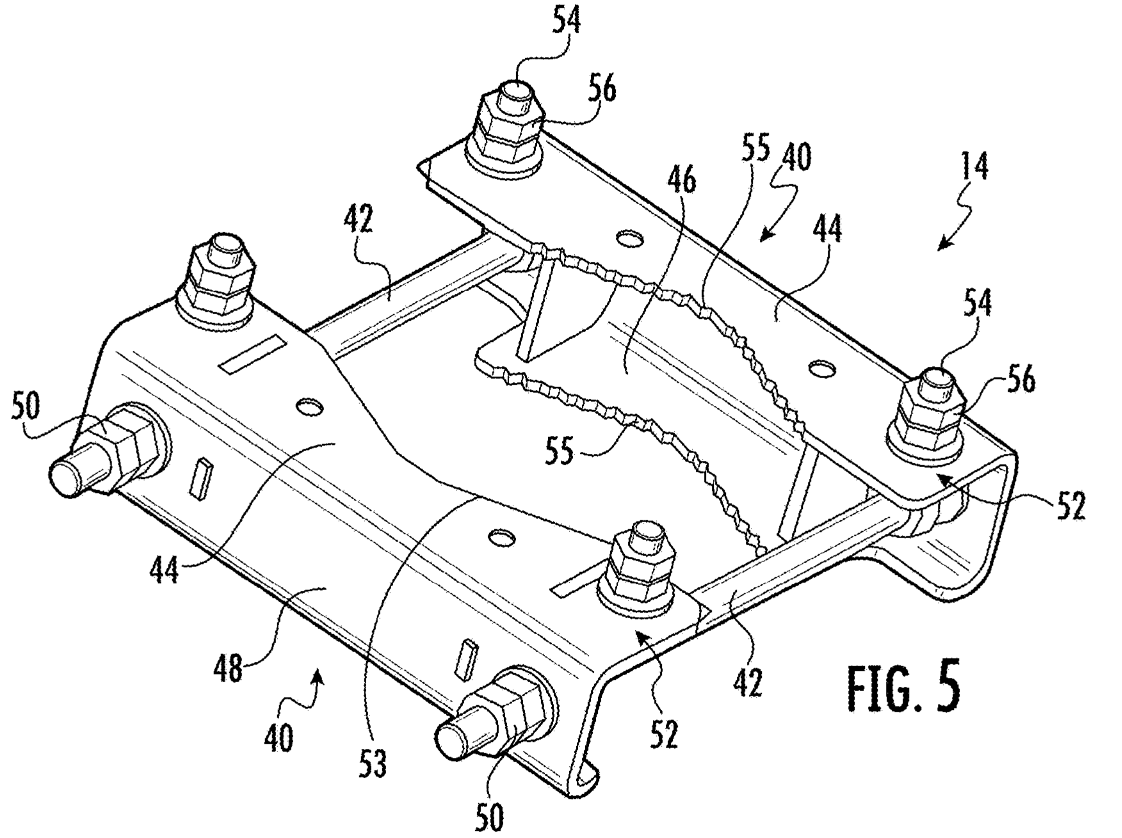
FIG. 5 is a front perspective view of the clamp of the mounting bracket of FIG. 1.
Figure 6:
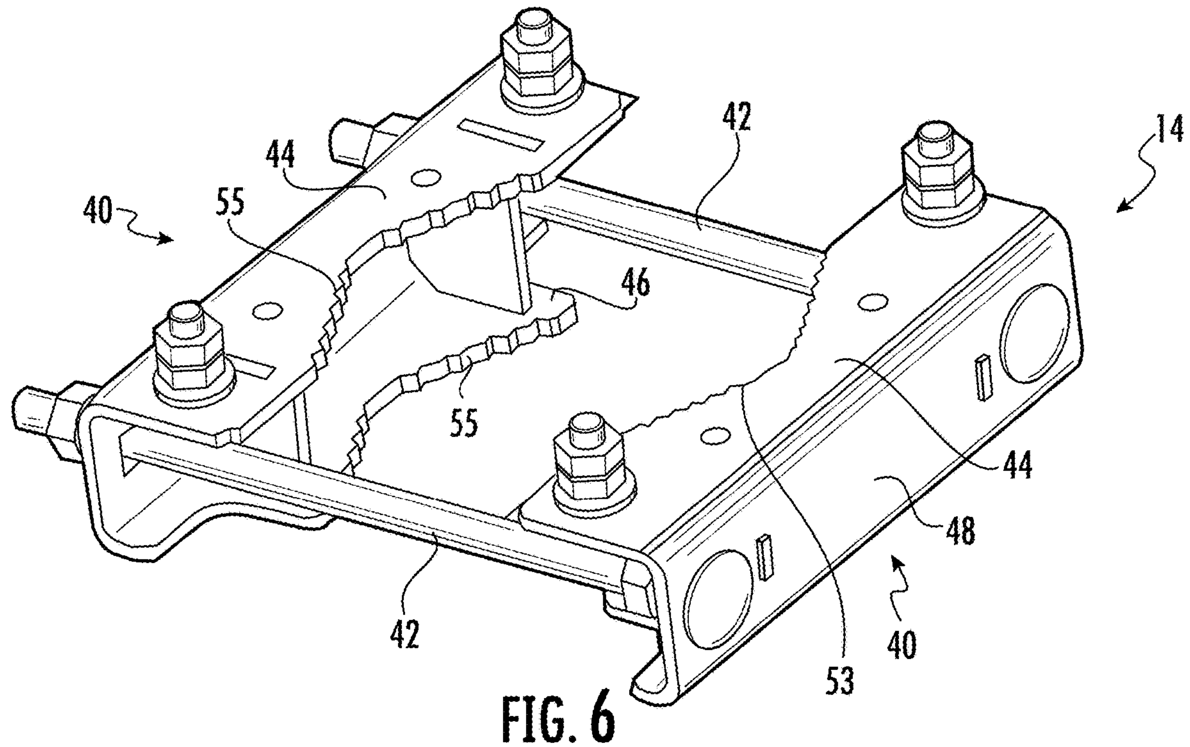
FIG. 6 is a rear perspective view of the clamp of the mounting bracket of FIG. 1.

Referring now to FIGS. 5 and 6, the clamp 14 includes two jaws 40 that are connected by two long bolts 42 or other elongate members. Each of the jaws 40 includes upper and lower plates 44, 46 and a backbone 48 that extends between the upper and lower plates 44, 46. The long bolts 42 extend between holes in the backbones 48. Nuts 50 receive the threaded ends of the long bolts 42. Each of the upper plates 44 includes two holes 52, one of which is located at each end of each upper plate 44. Also, each of the upper and lower plates 44, 46 includes a concave edge 53 with teeth 55.

The entire assembly of the mounting bracket 10 can be understood by examination of FIGS. 1 and 2. The clamp 14 is positioned below the legs 20 and spine 22, with the holes 52 of each of the upper plates 44 being aligned beneath a respective slot 32. A bolt 54 or other fastener is inserted through each of the holes 52 and the slots 32 and is captured with a nut 56.

Figure 7:
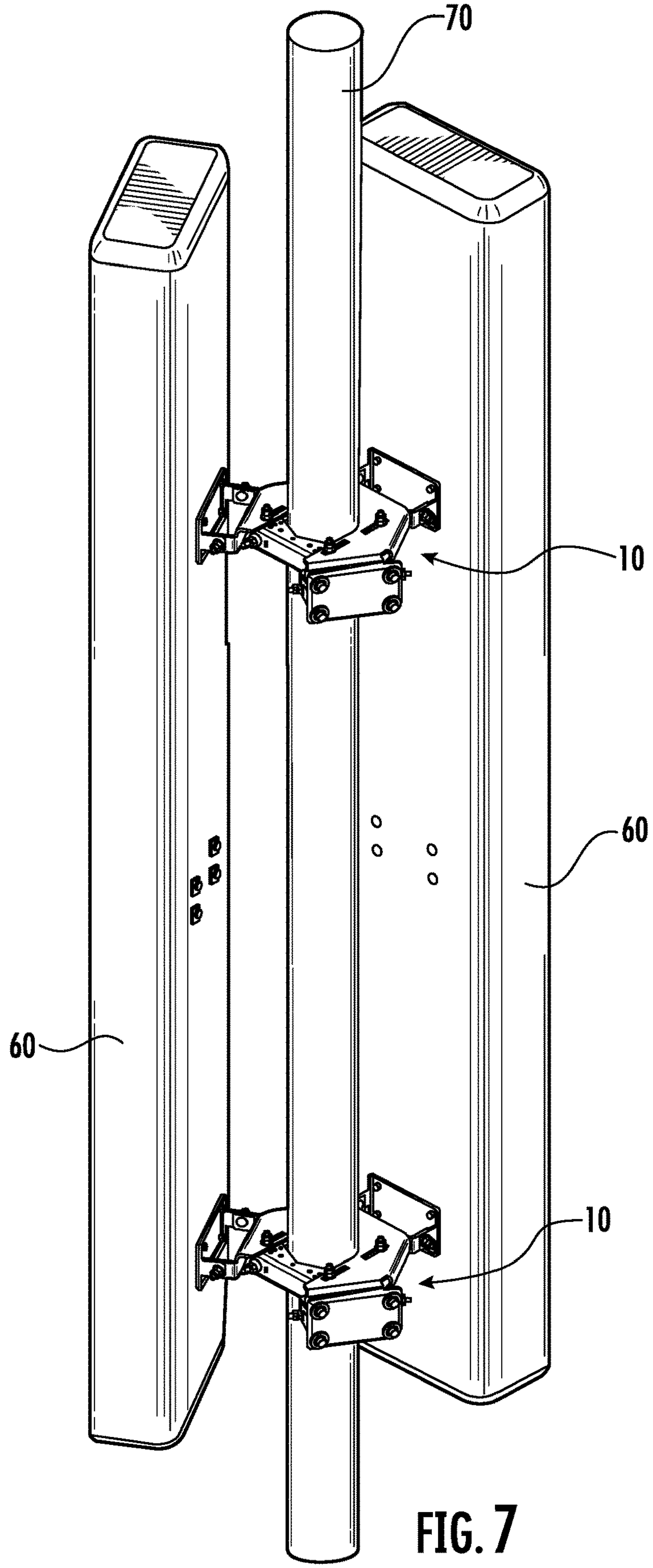
FIG. 7 is a perspective view of two antennas mounted to a monopole with two mounting brackets of FIG. 1, with a third antenna of a tri-sector arrangement removed for clarity.
Figure 8:
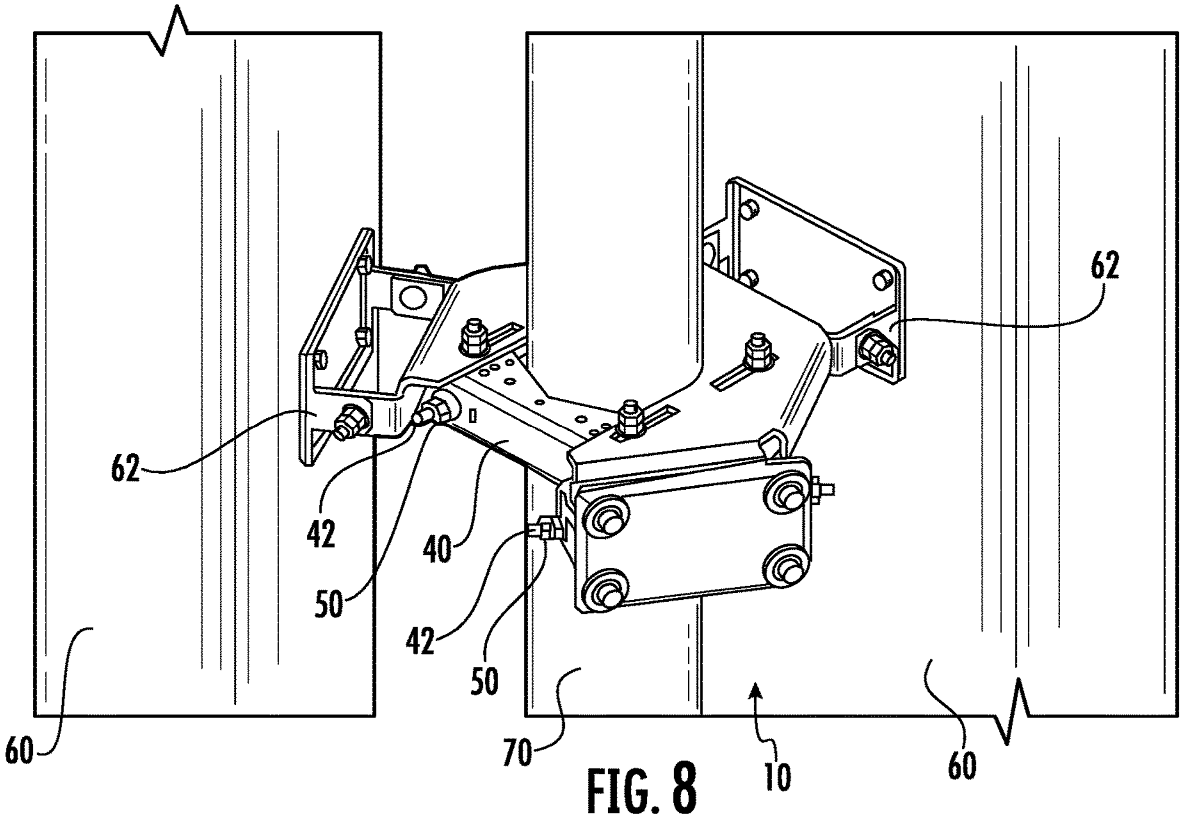
FIG. 8 is an enlarged partial perspective view of the antennas and one mounting bracket of FIG. 7.

As shown in FIGS. 7 and 8, the assembled mounting bracket 10 can be secured to a monopole 70 by simply engaging the monopole 70 with the jaws 40 and tightening the nuts 50 on the long bolts 42 until the clamp 14 is secured. The teeth 55 of the upper and lower plates 44, 46 help to provide grip on the monopole 70. The base plate 12 can then be fastened to the clamp 14 by positioning the monopole 70 in the monopole receiving space 23, inserting the bolts 54 through the holes 52 and the slots 32, and tightening the nuts 56. One or more antennas 60 can then be attached to the mounting bracket 10 by using the cars 28, 36 and bolts 30, 38 to attach a complementary bracket 62 of the antenna 60 (FIG. 8). (In many embodiments, two mounting brackets 10 will be used to mount three antennas 60, with an upper mounting bracket 10 and a lower mounting bracket 10 each being mounted to all three antennas 60 to provide both upper and lower mounting points on the monopole 70—see FIG. 7.) Note that in FIGS. 7 and 8 a third antenna of a typical tri-sector arrangement is removed for clarity It can be seen that the mounting bracket 10 can enable a technician to install three antennas 60 to a monopole 70 with a single mounting bracket 10 (or with two mounting brackets 10 if both upper and lower mounting points are desired for each antenna 60 as in FIG. 7). This can both simplify the mounting process and can reduced manufacturing costs, as fewer parts are required.

Those of skill in this art will recognize that the mounting bracket 10 may take different forms. For example, in some embodiments the slots 32 may include indicia (e.g., numbered graduated lines or the like) that indicate where the bolts 54 and nuts 56 should be positioned for a monopole of a particular diameter. In other embodiments, fewer antennas (e.g., two) may be mounted, so the flanges 26 may be separated by 180 degrees, and the flange 34 may be omitted. Other variations may be suitable for use. In further embodiments, two or all four of the slots 32 may be holes or other apertures instead.

It should also be noted that, although simple brackets 62 are illustrated herein for attaching the mounting bracket 10 to an antenna 60, other mechanisms for attaching the antenna 60 may be employed, including mounting bracket systems that enable an antenna to be deployed with an adjustable degree of downtilt. Such mechanisms are described in, for example, Chinese Patent Application No. 202210151137.1, filed Feb. 15, 2022, and Chinese Utility Model Application No. 202221062488.7, filed May 6, 2022, the disclosures of each of which are hereby incorporated by reference herein in full.

Referring now to FIGS. 9-13, another antenna mounting bracket 100, 100' according to embodiments of the present invention is illustrated. Similar to the mounting bracket 10 described herein, the mounting bracket 100 can enable a technician to install up to three antennas 60 to a monopole 70 with a single mounting bracket 100 (or with two mounting brackets 100 if both upper and lower mounting points are desired for each antenna 60, see, e.g., FIGS. 17-18B). In the addition, as described in further detail below, the mounting bracket 100 can be adjustable to accommodate multiple monopole diameters. This can both simplify the mounting process and can reduced manufacturing costs, as fewer parts are required.

Figure 9:
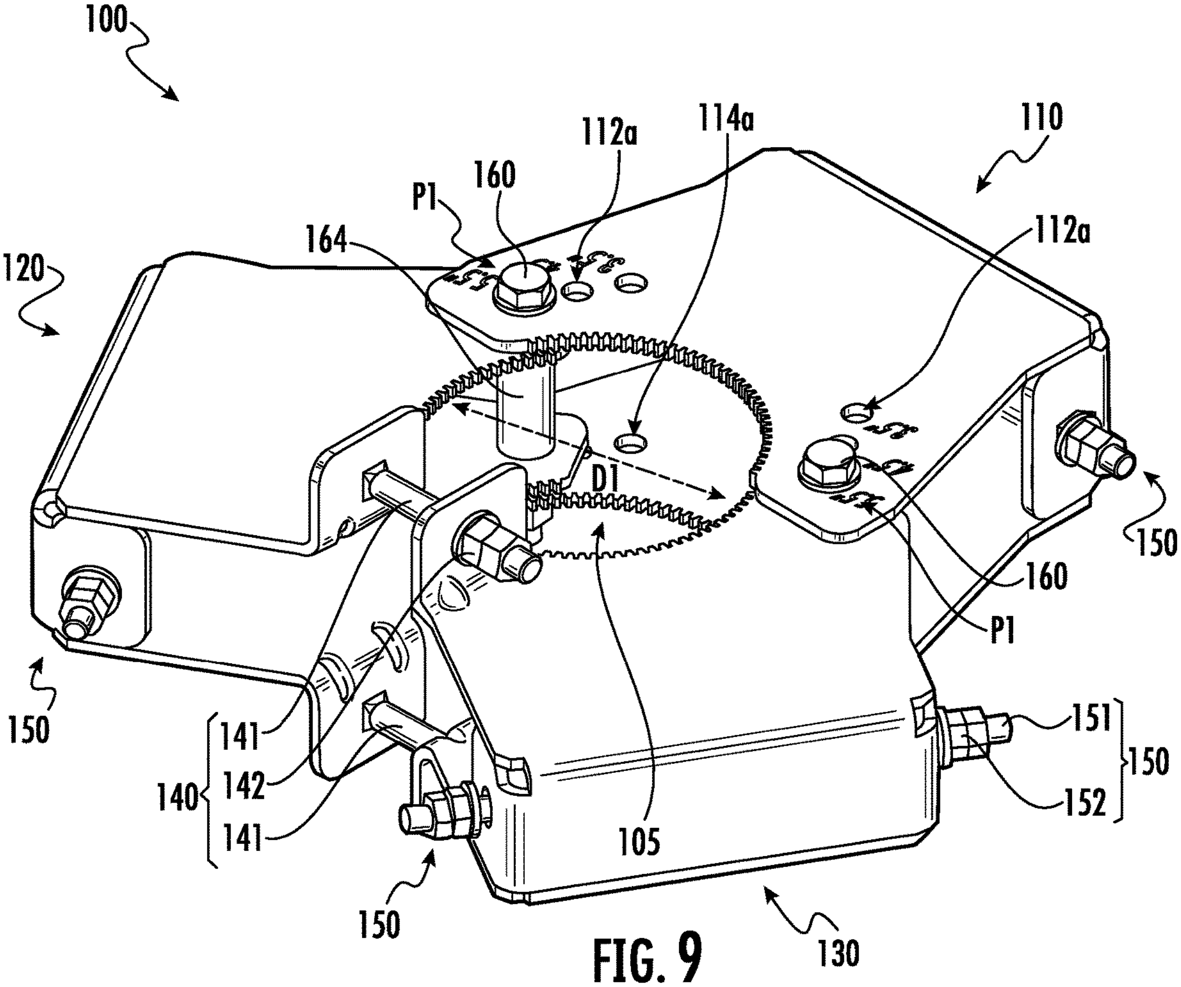
FIG. 9 is a top perspective view of another antenna mounting bracket according to embodiments of the present invention.

As shown in FIG. 9 (and FIG. 13), the mounting bracket 100, 100' includes a base clamp 110 and two adjustable clamps 120, 130. The adjustable clamps 120, 130 are pivotably coupled to the base clamp 110 at respective pivot points P1. In some embodiments, the adjustable clamps 120, 130 are coupled to the base clamp 110 via bolts 160 that are received through apertures 112*a*, 114*a* in the base clamp 110 and corresponding apertures 122*a*, 132*a* in the adjustable clamps 120, 130 (see also, e.g., FIG. 11). The base clamp 110 and adjustable clamps 120, 130 define a receiving space 105 for a monopole 70. In some embodiments, the adjustable clamps 120, 130 may be secured together via fasteners 140 (e.g., nuts 142 and bolts 141), for example, when securing the mounting bracket 100 to a monopole 70 (i.e., securing the monopole 70 within the receiving space 105) (see, e.g., FIGS. 17-18B). As discussed in further detail below, a diameter (D1) of the receiving space 105 may be adjustable to accommodate different sized (i.e., diameter) monopoles 70 therein. For example, in some embodiments, the receiving space 105 of the mounting bracket 100 may be adjustable to accommodate monopoles 70 having a diameter of 3.5 inches, 4.5 inches, or 5.5 inches.

In use, the adjustable clamps 120, 130 may be pivoted away from each other (i.e., about pivot points P1) to an "open" position which allows a monopole 70 to be received within the receiving space 105 of the mounting bracket 100. The adjustable clamps 120, 130 may then pivoted toward each other (i.e., about pivot points P1) to a "closed" position with the monopole 70 captured within the receiving space 105 of the mounting bracket 100. Fasteners 140 are used to secure the adjustable clamps 120, 130 together, thereby securing the mounting bracket 100 to the monopole 70. After secured to the monopole 70, antennas 60 may be mounted to the mounting bracket 100 utilizing a complementary bracket 62 of the antenna 60, as described herein, and fasteners 150 (e.g., nuts 152 and bolts 151) (see, e.g., FIGS. 17-18B).

Figure 10A:
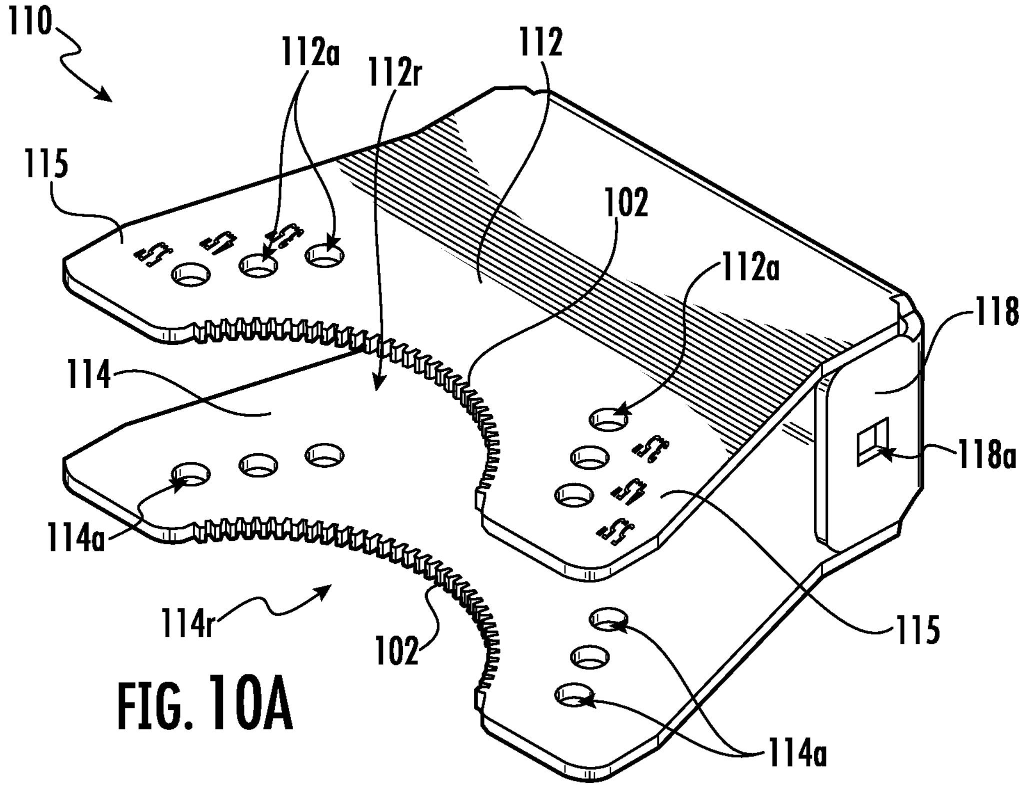
FIG. 10A is a top perspective view of the base clamp of the mounting bracket of FIG. 9.
Figure 10B:
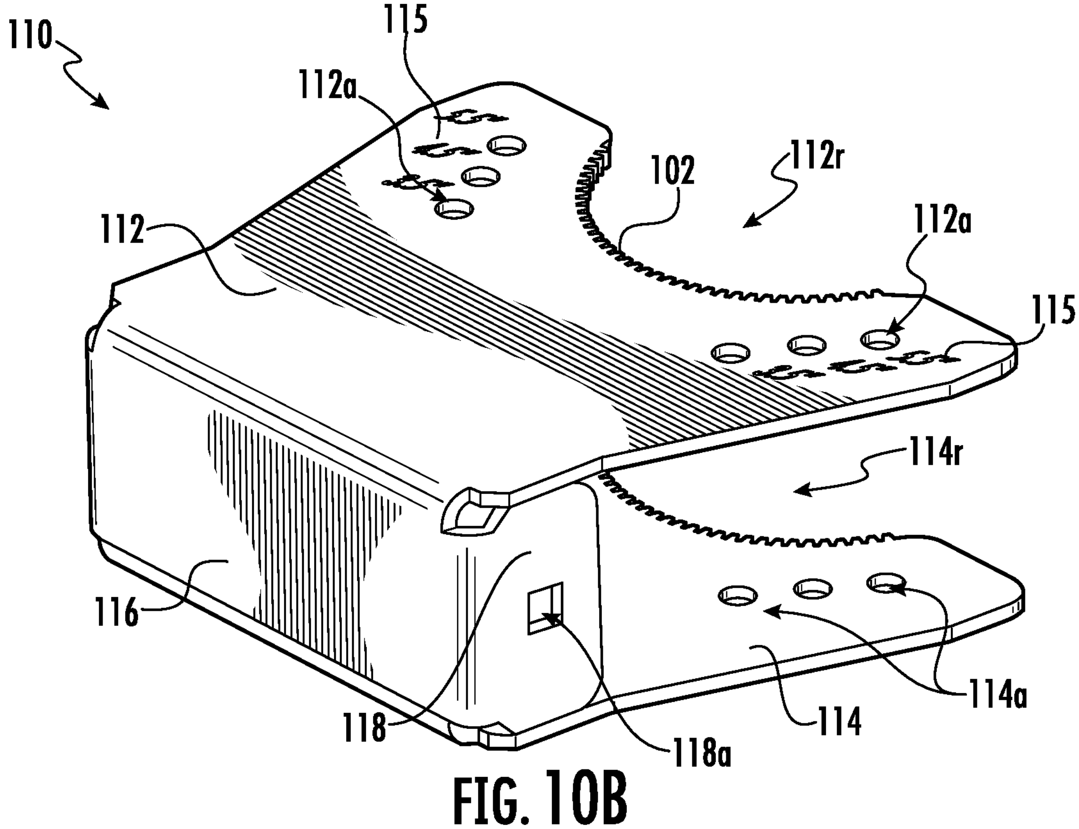
FIG. 10B is a rear perspective view of the base clamp of FIG. 10A.
Figure 10C:
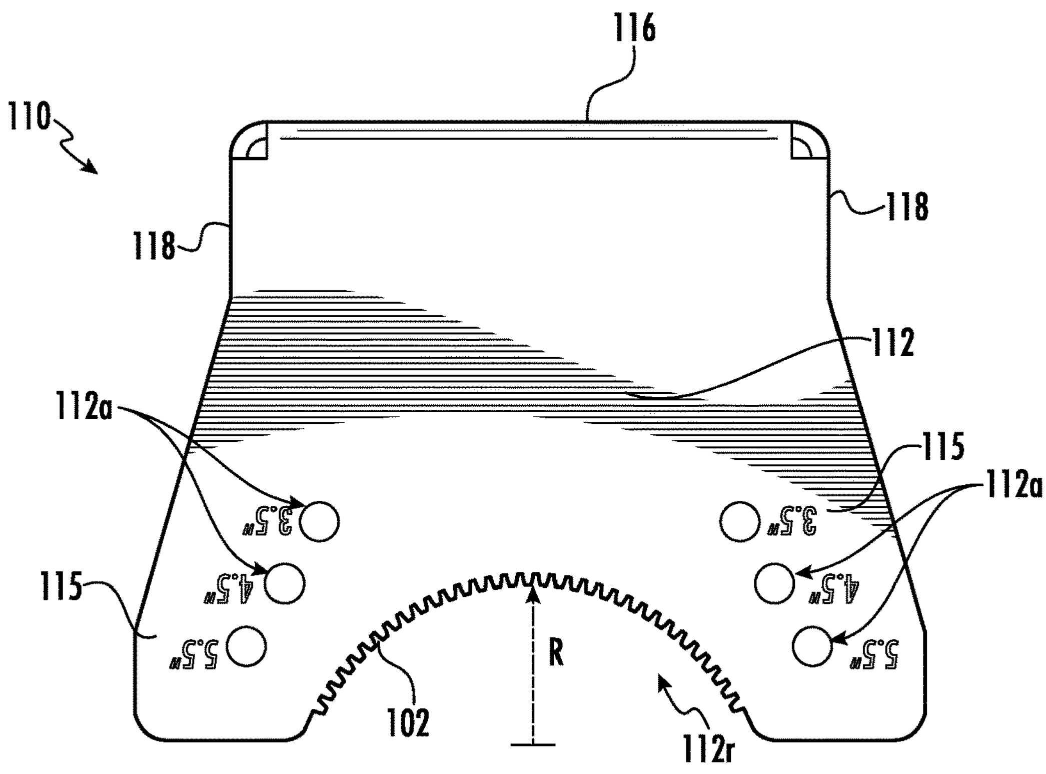
FIG. 10C is a top view of the base clamp of FIG. 10A.

Referring to FIGS. 10A-10C, the base clamp 110 of the mounting bracket 100 is illustrated, and will be described in further detail below. As shown in FIGS. 10A-10C, the base clamp 110 has an upper plate 112 and a lower plate 114. As shown in FIGS. 10A-10B, in some embodiments, the upper plate 112 and lower plate 114 are mirror images of each other. A spine 116 extends between a rear end of each plate 112, 114 and couples the upper and lower plates 112, 114 together. In some embodiments, the base clamp 110 may be formed from a single piece of material (e.g., steel) that is bent to form the spine 116 and the upper and lower plates 112, 114 of the base clamp 110.

At an opposing front end of each plate 112, 114 (i.e., opposite the spine 116) resides a concave edge or upper and lower recess 112*r*, 114*r*. The upper and lower recesses 112*r*, 114*r* form a segment of the receiving space 105 and are configured to receive a portion of the monopole 70. Each recess 112*r*, 114*r* may have a radius (R) of 5.5 inches, typically, and are configured to accept monopoles 70 have a diameter in a range of about 3.5 inches to about 5.5 inches when coupled with other brackets 120, 130 (see, e.g., FIG. 10C). In some embodiments, each recess 112*r*, 114*r* may have a plurality of protrusions or teeth 102 that extend radially inwardly into the respective recess 112*r*, 114*r*. The teeth 102 of the upper and lower plates 112, 114 may help to provide grip on the monopole 70. In addition, the teeth 102 may eliminate the need to use additional brackets to help maintain the mounting bracket 100 parallel with the ground.

As shown in FIGS. 10A-10B, in some embodiments, the base clamp 110 further comprises a pair of flanged edges 118. Each flanged edge 118 is coupled to an opposing side of the spine 116 and extends inwardly toward the front end of each plate 112, 114 (i.e., toward the upper and lower recesses 112*r*, 114*r*). Each flanged edge 118 comprises an aperture 118*a* configured to receive a bolt 151 of fastener 150 that may be used to secure the complementary bracket 62 of the antenna 60 to the base clamp 110 (see, e.g., FIGS. 18A-18B). As shown in FIGS. 10A-10B, in some embodiments, the apertures 118*a* may have a square shape.

Still referring to FIGS. 10A-10C, as noted above, the upper plate 112 and lower plate 114 each comprise a plurality of apertures or pivot holes 112*a*, 114*a*. The pivot holes 112*a* in the upper plate 112 are aligned with corresponding pivot holes 114*a* in the lower plate 114 and are configured to receive a corresponding fastener 160 therethrough. The fasteners 160 form the pivot points P1 of the adjustable clamps 120, 130 when coupled to the base plate 110. In some embodiments, each plate 112, 114 may comprise six pivot holes 112*a*, 114*a*. As shown in FIGS. 10A-10C, the pivot holes 112*a*, 114*a* reside adjacent to the upper and lower recesses 112*r*, 114*r*. As shown in FIG. 10C, for example, in the upper plate 112, three pivot holes 112*a* reside adjacent one side of the recess 112*r* and provide the pivot point P1 for one adjustable clamp 120, and three pivot holes 112*a* reside adjacent the opposing side of the recess 112*r* and provide the pivot point P1 for the other adjustable clamp 130 (see also, e.g., FIG. 9). As shown in FIG. 10C, each of the pivot holes 112*a* on a respective side of the recess 112*r* correspond to a different diameter monopole 70, for example, 3.5-inch, 4.5-inch, and 5.5-inch diameter monopoles, and thus, provides a corresponding pivot point P1 for each adjustable clamp 120, 130 to accommodate the respective diameter monopoles. As noted above, the pivot holes 114*a* in the lower plate 114 are aligned with the corresponding pivot holes 112*a* in the upper plate 112. In some embodiments, the upper plate 112 may also include indica 115 that indicates which pivot holes 112*a*, 114 correspond with which diameter monopole 70 (e.g., 3.5 inch, 4.5 inch, or 5.5 inch).

Figure 11:
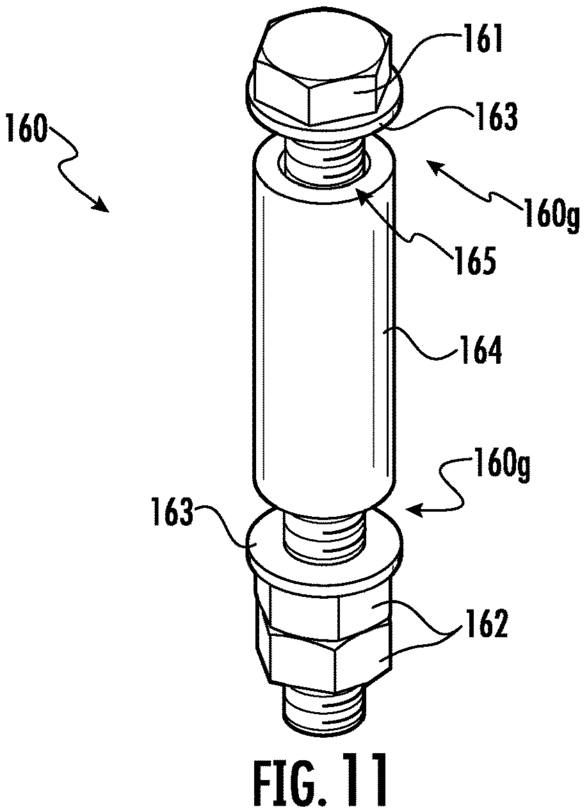
FIG. 11 is a side perspective view of an exemplary pivot fastener for the mounting bracket of FIG. 9.

Referring to FIG. 11, an exemplary fastener 160 that may be used to couple the adjustable clamps 120, 130 to the base clamp 110 is illustrated. As shown in FIG. 11, in some embodiments, the fastener 160 may include a bolt 161, a pair of washers 163, and a pair of nuts 162. In some embodiments, the fastener 160 also includes a support sleeve 164 having a bore 165 extend therethrough. As shown in FIG. 11, the bore 165 of the support sleeve 164 is sized and configured to receive the bolt 161. The support sleeve 164 extends between corresponding upper and lower plates 122, 124, 132, 134 of the adjustable clamps 120, 130 (see, e.g., FIGS. 12A-12C) when coupled to the base plate 110, and may provide additional structural support to the pivot points P1 of the mounting bracket 100.

Figure 12A:
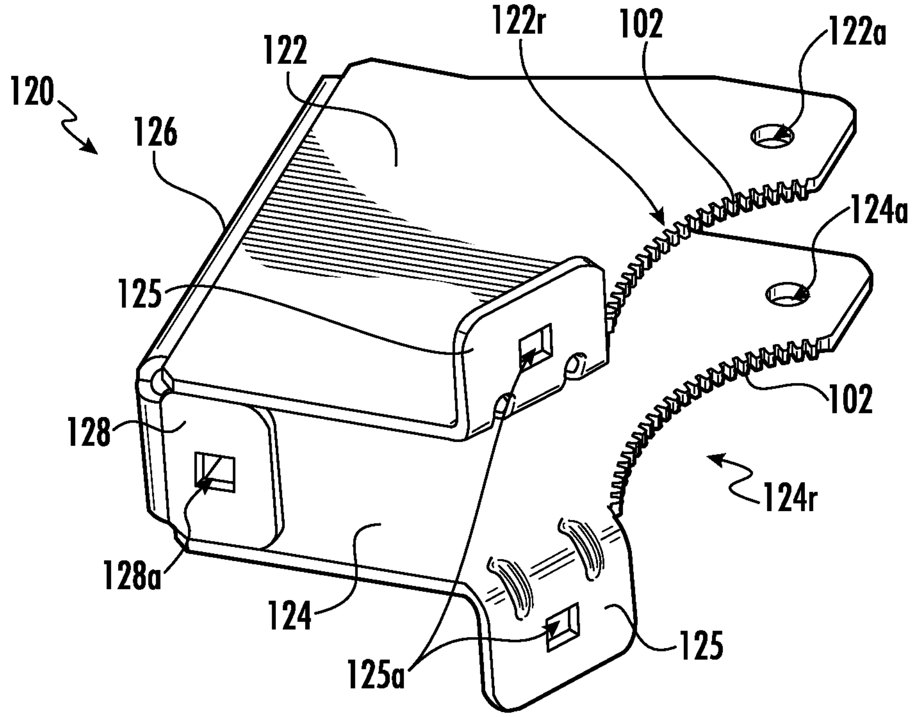
FIG. 12A is a top perspective view of an adjustable clamp of the mounting bracket of FIG. 9.
Figure 12B:
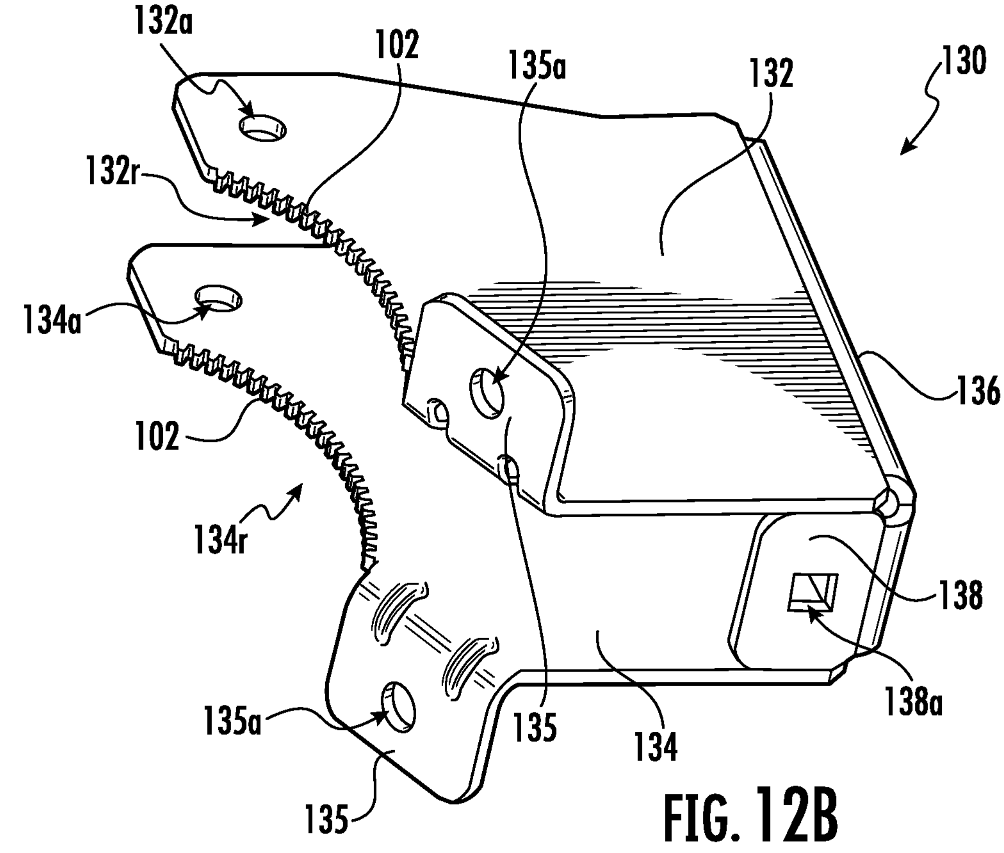
FIG. 12B is a top perspective view of the other adjustable clamp of the mounting bracket of FIG. 9.
Figure 12C:
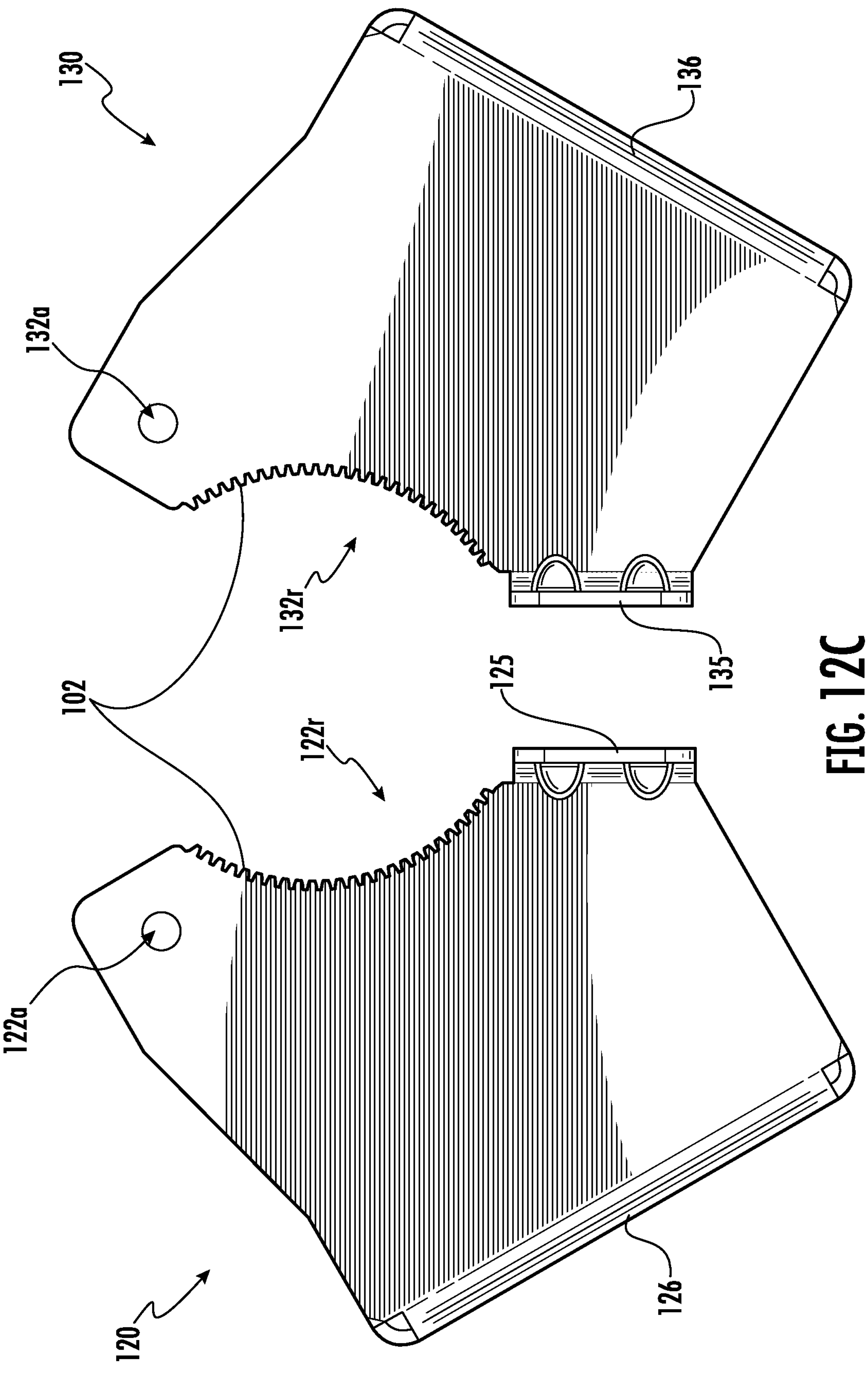
FIG. 12C is a top view of the two adjustable clamps of the mounting bracket of FIG. 9.
Figure 13:
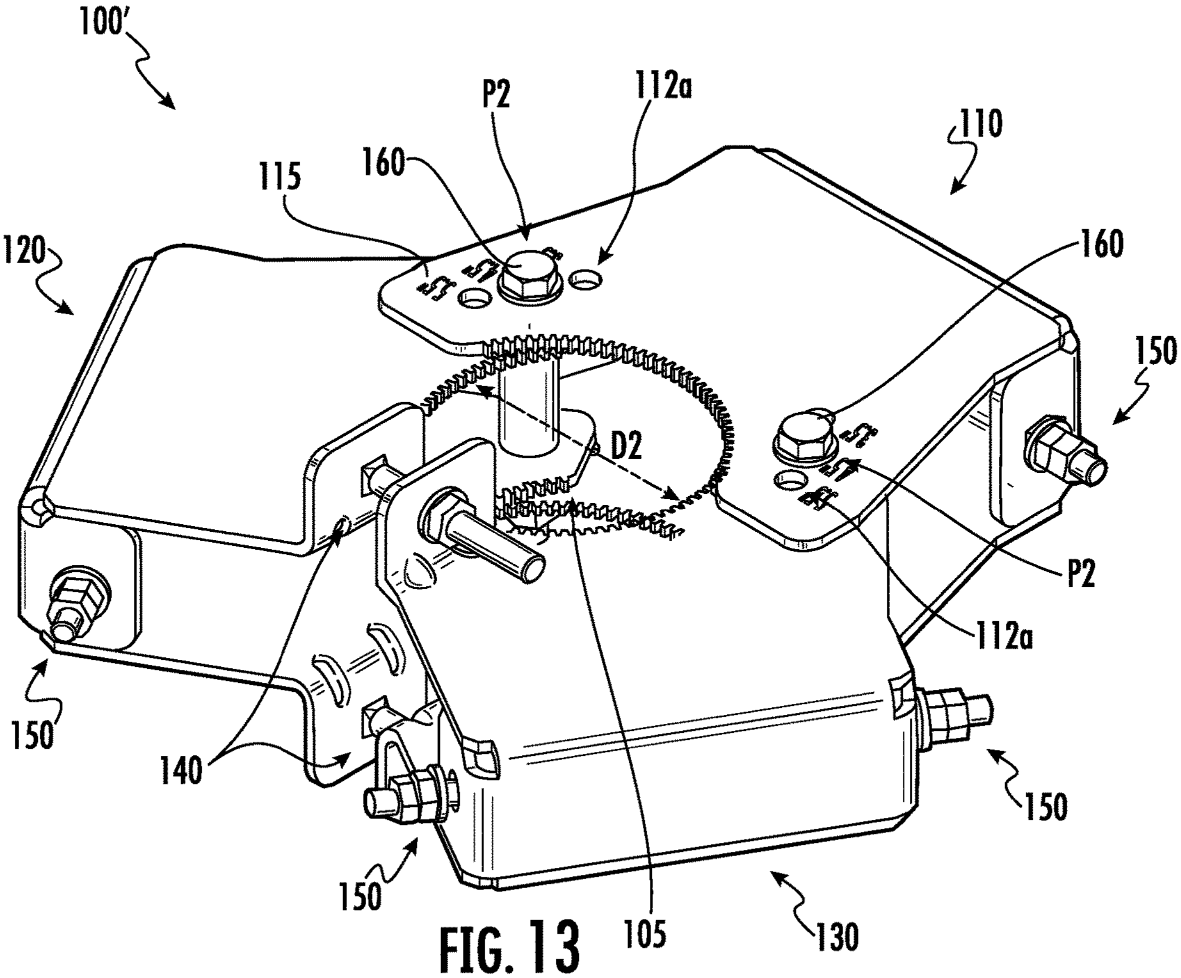
FIG. 13 is a top perspective view of the mounting bracket of FIG. 9 illustrating the pivot fastener at a different position to accommodate a different diameter monopole (i.e., 4.5 inch).

Referring now to FIGS. 12A-12C, the adjustable clamps 120, 130 of the mounting bracket 100 are illustrated, and will be described in further detail below. FIG. 12A is a perspective view of one adjustable clamp 120 and FIG. 12B is a perspective view of the other adjustable clamp 130. FIG. 12C is a top view of both adjustable clamps 120, 130. As shown in FIGS. 12A-12B, similar to the base clamp 110 described herein, each adjustable clamp 120, 130 has an upper plate 122, 132 and a lower plate 124, 134. A spine 126, 136 extends between a rear end of each respective upper and lower plates 122, 132, 124, 134 and couples the upper and lower plates 122, 132, 124, 134 of the respective adjustable clamps 120, 130 together. In some embodiments, the adjustable clamps 120, 130 may be formed from a single piece of material (e.g., steel) that is bent to form the spines 126, 136 and the upper and lower plates 122, 132, 124, 134.

At an opposing front end of each plate 122, 124, 132, 134 (i.e., opposite the respective spines 126, 136) resides a concave edge or upper and lower recess 122*r*, 124*r*, 132*r*, 134*r*. The upper and lower recesses 122*r*, 124*r*, 132*r*, 134*r* form a segment of the receiving space 105 and are configured to receive a portion of the monopole 70. In some embodiments, each recess 122*r*, 124*r*, 132*r*, 134*r* has a plurality of protrusions or teeth 102 that extend radially inwardly into the respective recess 122*r*, 124*r*, 132*r*, 134*r*. The teeth 102 of the upper and lower plates 122, 124, 132, 134 may help to provide grip on the monopole 70. In addition, as discussed above, the teeth 102 may eliminate the need to use additional brackets to help maintain the mounting bracket 100 parallel with the ground.

As shown in FIGS. 12A-12B, in some embodiments, each adjustable clamp 120, 130 may further comprise a pair of flanged edges 128, 138. Each flanged edge 128, 138 is coupled to an opposing side of the respective spine 126, 136 and extends inwardly toward the front end of each plate 122, 124, 132, 134 (i.e., toward the upper and lower recesses 122*r*, 124*r*, 132*r*, 134*r*). Each flanged edge 128, 138 comprises an aperture 128*a*, 138*a* configured to receive a bolt 151 of fastener 150 to secure the complementary bracket 62 of the antenna 60 to the respective adjustable clamp 120, 130 (see, e.g., FIG. 17). As shown in FIGS. 12A-12B, in some embodiments, the apertures 128*a*, 138*a* may have a square shape.

Still referring to FIGS. 12A-12C, as discussed above, the upper plate 122, 132 and lower plate 124, 134 of each adjustable clamp 120, 130 also comprise an aperture or pivot hole 122*a*, 124*a*, 132*a*, 134*a*. As shown in FIG. 12C, the pivot holes 122*a*, 132*a* in the upper plates 122, 132 reside adjacent one side of the recess 122*r*, 132*r*. The pivot holes 122*a*, 132*a* in the upper plates 122, 132 are aligned with corresponding pivot holes 124*a*, 134*a* in the lower plate 124, 134 to receive a corresponding fastener 160 therethrough and form the pivot points P1 of the adjustable clamps 120, 130 when coupled to the base plate 110 (i.e., the fastener 160 is also received through corresponding pivot holes 112*a*, 114*a* of the base plate 110 that is aligned with the pivot holes 122*a*, 124*a*, 132*a*, 134*a* for the respective adjustable clamp 120, 130).

The upper and lower plates 122, 124, 132, 134 of each adjustable clamp 120, 130 further comprise flanges 125, 135 that extend outwardly from the respective upper and lower plates 122, 124, 132, 134. The flanges 125, 135 reside on the opposing side of the recesses 122*r*, 124*r*, 132*r*, 134*r* from the pivot holes 122*a*, 124*a*, 132*a*, 134*a*. Each flange 125, 135 includes an aperture 125*a*, 135*a* configured to receive a bolt 141 of fastener 140 to secure the adjustable clamps 120, 130 together (e.g., when securing the mounting bracket 100 to the monopole 70) (see, e.g., FIGS. 17 and 18A-18B).

As noted above, the diameter (D1) of the receiving space 105 is adjustable to accommodate different sized (i.e., diameter) monopoles 70 therein. This can be accomplished by a technician moving the fasteners 160 to change the pivot points P1 of the adjustable clamps 120, 130 relative to the base clamp 110. For example, as shown in FIG. 9, the mounting bracket 100 is adjusted to accommodate a 5.5-inch diameter monopole 70. The fasteners 160 are inserted through the pivot holes 112*a*, 114*a* corresponding to a 5.5-inch diameter monopole 70 (as indicated by indicia 115) which provides a receiving space 105 having a first diameter (D1) of approximately 5.5 inches (compare with the mounting bracket 100' illustrated in FIG. 13 that is adjusted to accommodate a 4.5-inch diameter monopole 70). The fasteners 160 are inserted through different pivot holes 112*a*, 114*a* corresponding to a 4.5-inch diameter monopole 70 which changes the corresponding pivot points P2 for the adjustable clamps 120, 130 relative to the base clamp 110 and allows the receiving space 105 to have a smaller second diameter (D2), thereby allowing the mounting bracket 100' to be secured to the smaller 4.5 inch diameter monopole 70 (i.e., compared to the mounting bracket 100 shown in FIG. 9 adjusted to fit a 5.5-inch diameter monopole 70).

Figure 14:
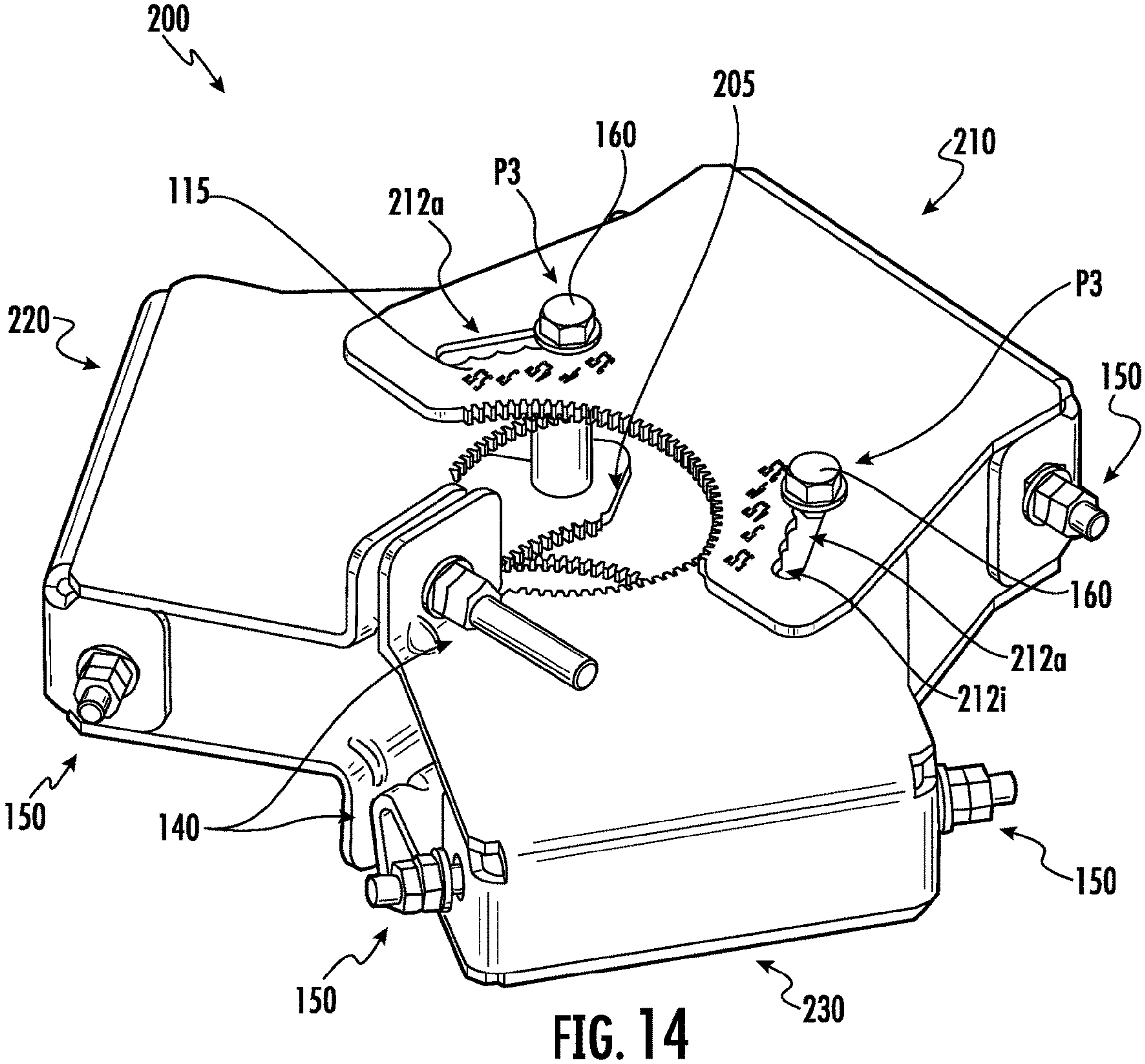
FIG. 14 is a top perspective view of another antenna mounting bracket according to embodiments of the present invention.
Figure 15A:
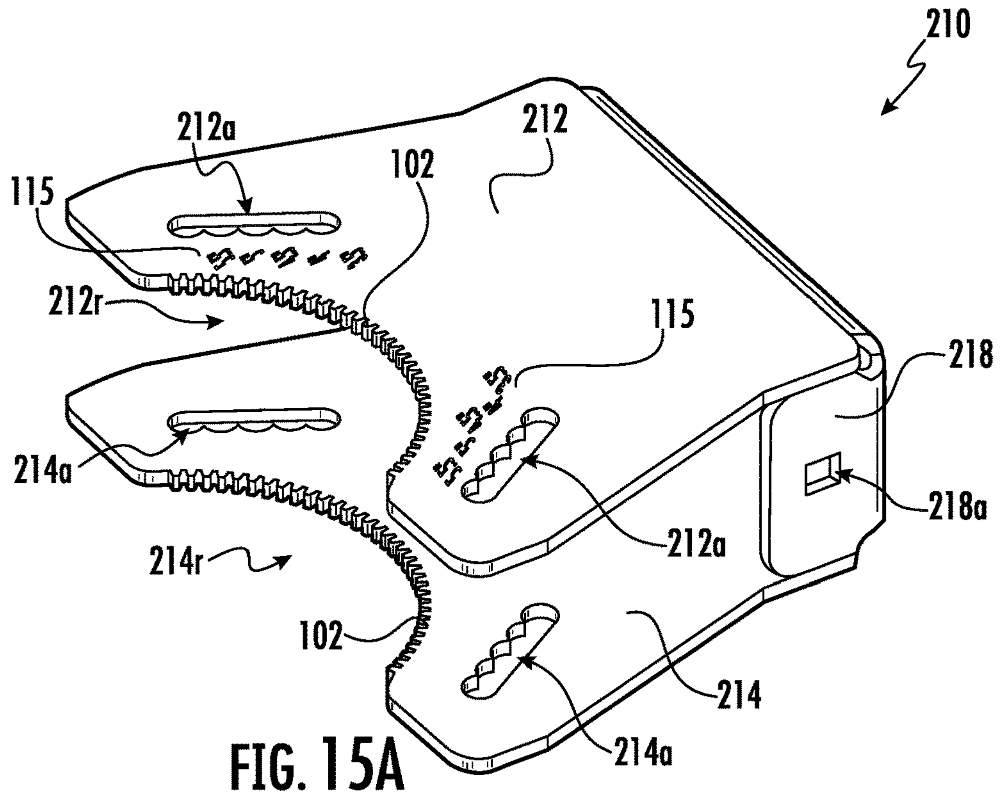
FIG. 15A is a top perspective view of the base clamp of the mounting bracket of FIG. 14.
Figure 15B:
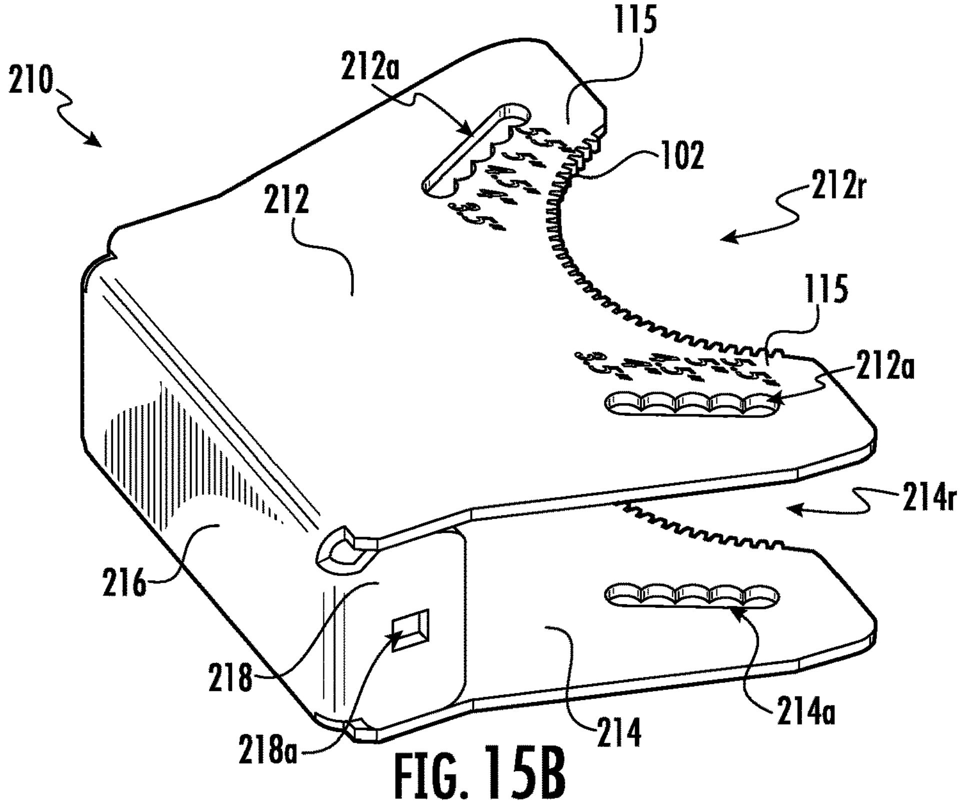
FIG. 15B is a rear perspective view of the base clamp of FIG. 14.
Figure 15C:
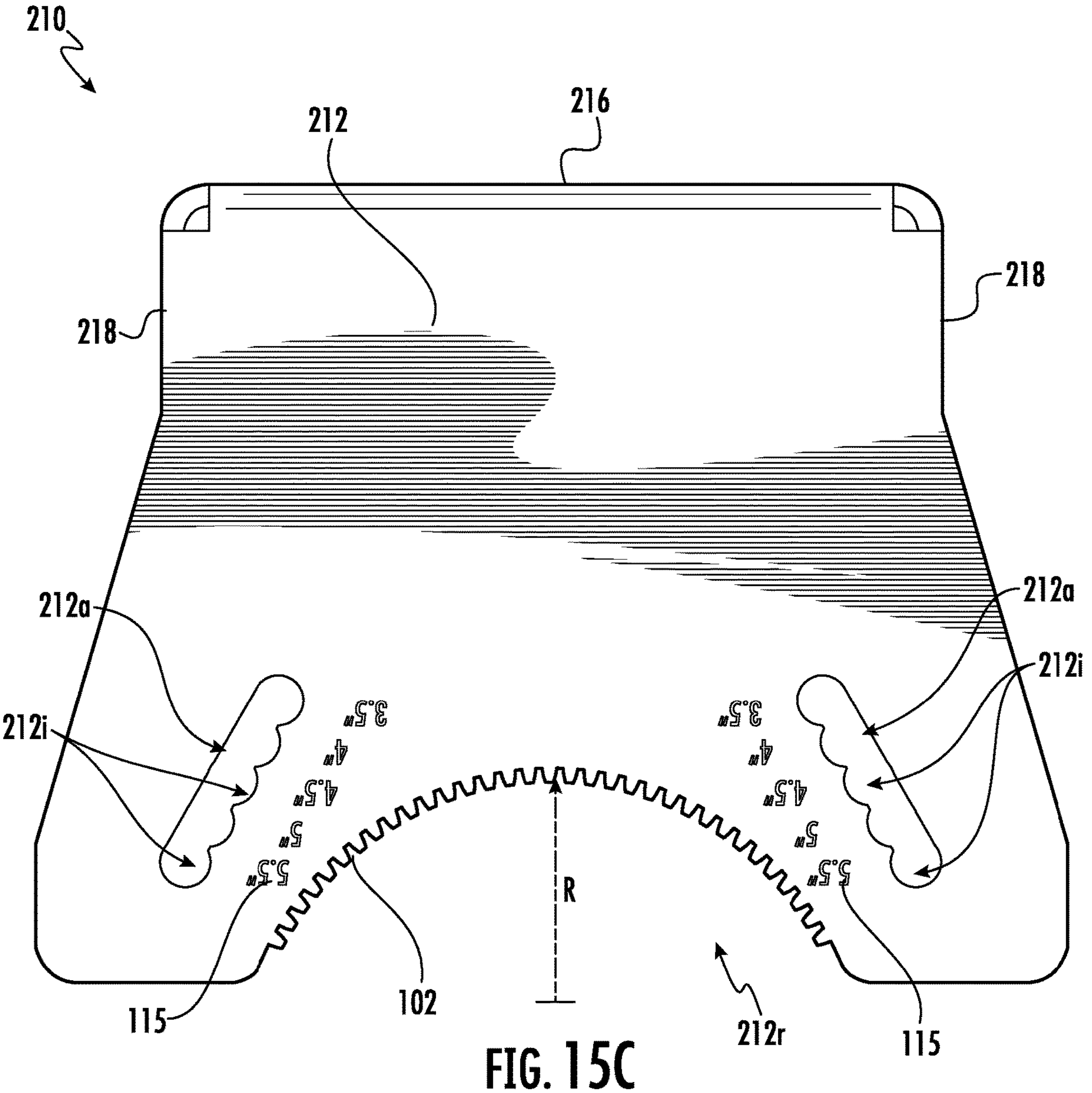
FIG. 15C is a top view of the base clamp of FIG. 14.
Figure 16:
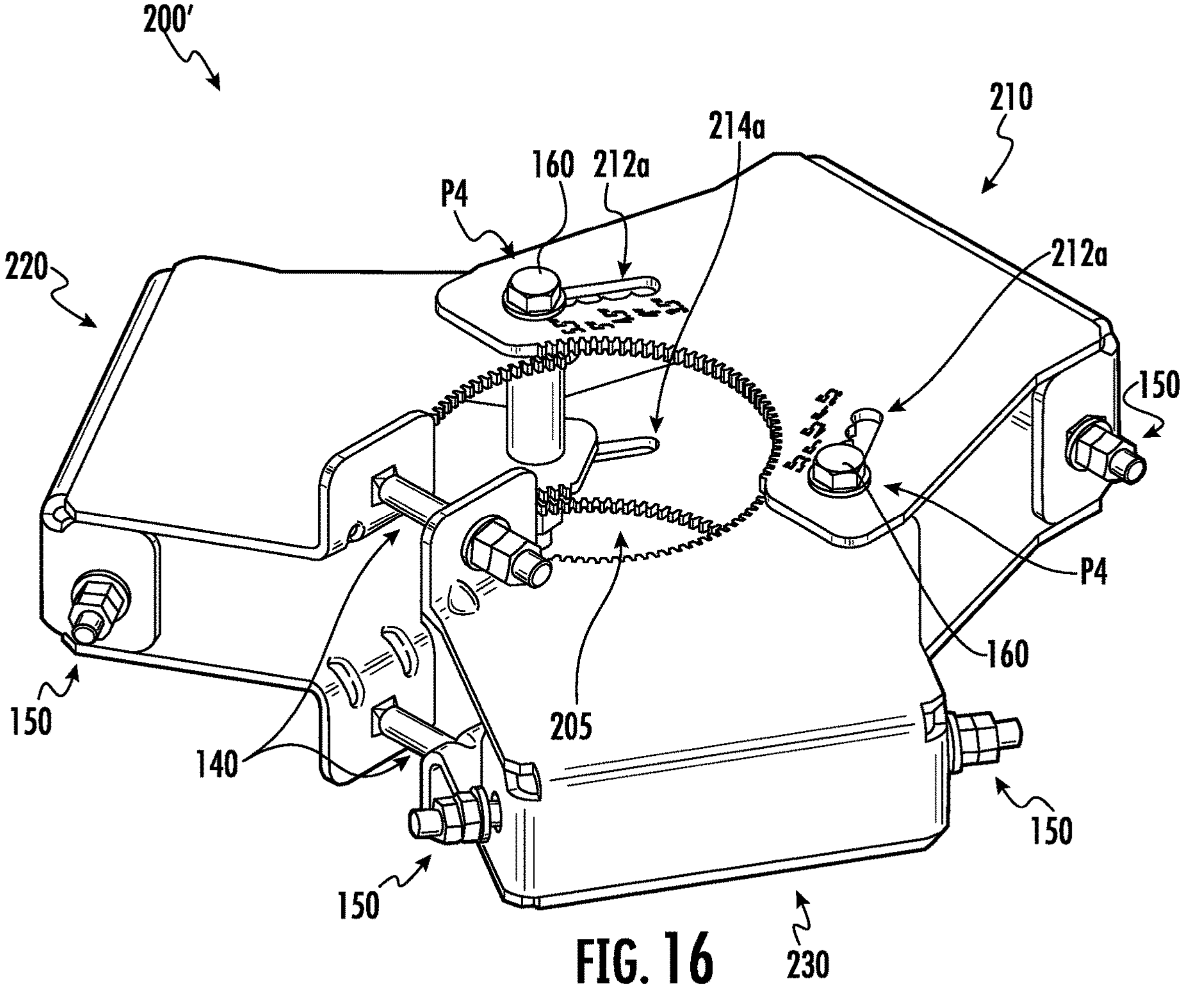
FIG. 16 is a top perspective view of the mounting bracket of FIG. 14 illustrating the pivot fastener at a different position to accommodate a different diameter monopole.

Referring now to FIGS. 14-16, another antenna mounting bracket 200 according to embodiments of the present invention is illustrated. Properties and/or features of the mounting bracket 200 may be as described above in reference to the mounting bracket 100 shown in FIGS. 9-13 and duplicate discussion thereof may be omitted herein for the purposes of discussing FIGS. 14-16.

As shown in FIGS. 14-16, the mounting bracket 200, 200' differs from the mounting bracket 100 in that the pivot holes 112*a*, 114*a* in the base clamp 110 of mounting bracket 100 are replaced with slots 212*a*, 214*a* having indentations (or recesses) 212*i* in the base clamp 210 of the mounting bracket 200. In some embodiments, the slots 212*a*, 214*a* having indentations 212*i* allow the mounting bracket 200 to be adjustable to accommodate a larger number of monopole diameters, for example, monopoles 70 having a diameter of 3.5 inches, 4 inches, 4.5 inches, 5 inches, or 5.5 inches (see, e.g., FIG. 15C).

As shown in FIG. 14 (and FIG. 16), the mounting bracket 200, 200' includes a base clamp 210 and two adjustable clamps 220, 230. The adjustable clamps 220, 230 are pivotably coupled to the base clamp 210 at respective pivot points P3. In some embodiments, the adjustable clamps 220, 230 are coupled to the base clamp 210 via bolts 160 that are received through corresponding slots 212*a*, 214*a* in the base clamp 210 (see also, e.g., FIG. 11). FIGS. 15A-15C illustrate the base clamp 210 of the mounting bracket 200. As shown in FIGS. 15A-15C, the slots 212*a*, 214*a* in the base clamp 210 comprise indentations 212*i* which correspond to different diameter monopoles 70.

Figure 17:
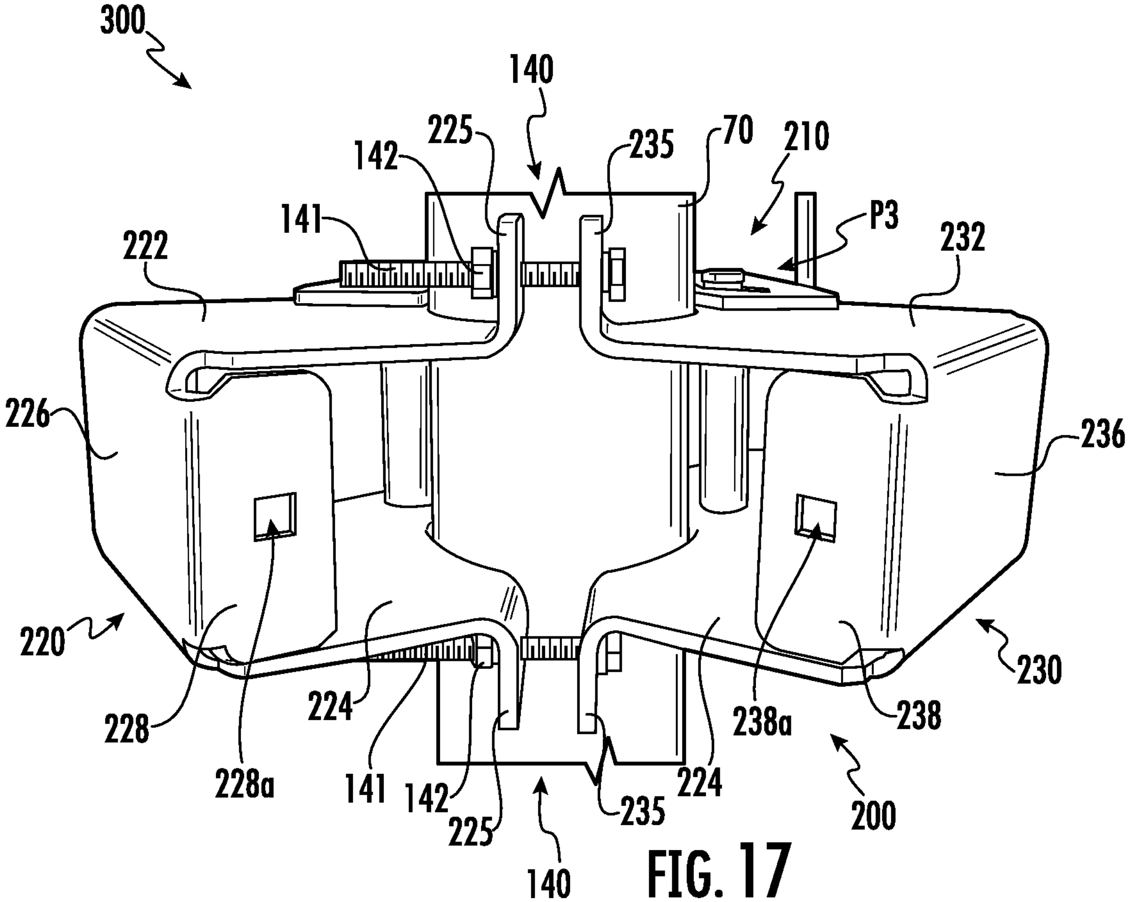
FIG. 17 is a side view of the mounting bracket of FIG. 14 secured to a monopole according to embodiments of the present invention.
Figure 18A:
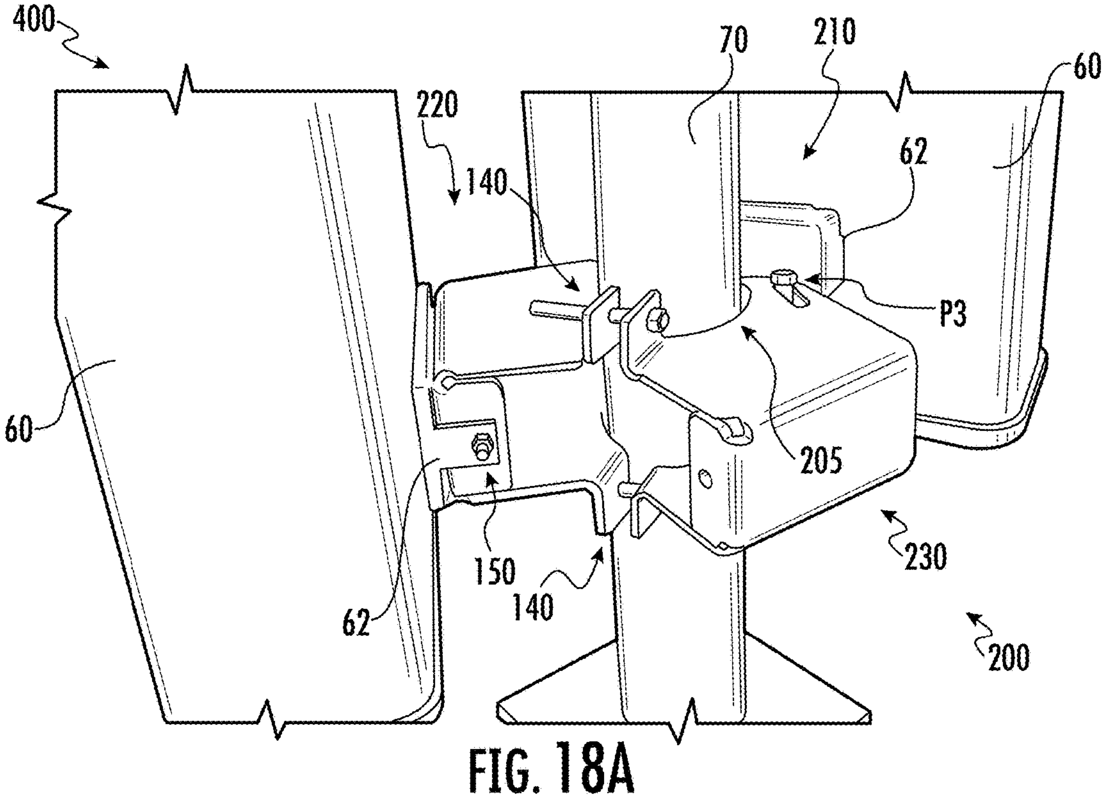
FIG. 18A is an enlarged perspective view of an antenna mounting bracket assembly having two antennas mounted to a monopole utilizing the mounting bracket of FIG. 14 according to embodiments of the present invention.
Figure 18B:
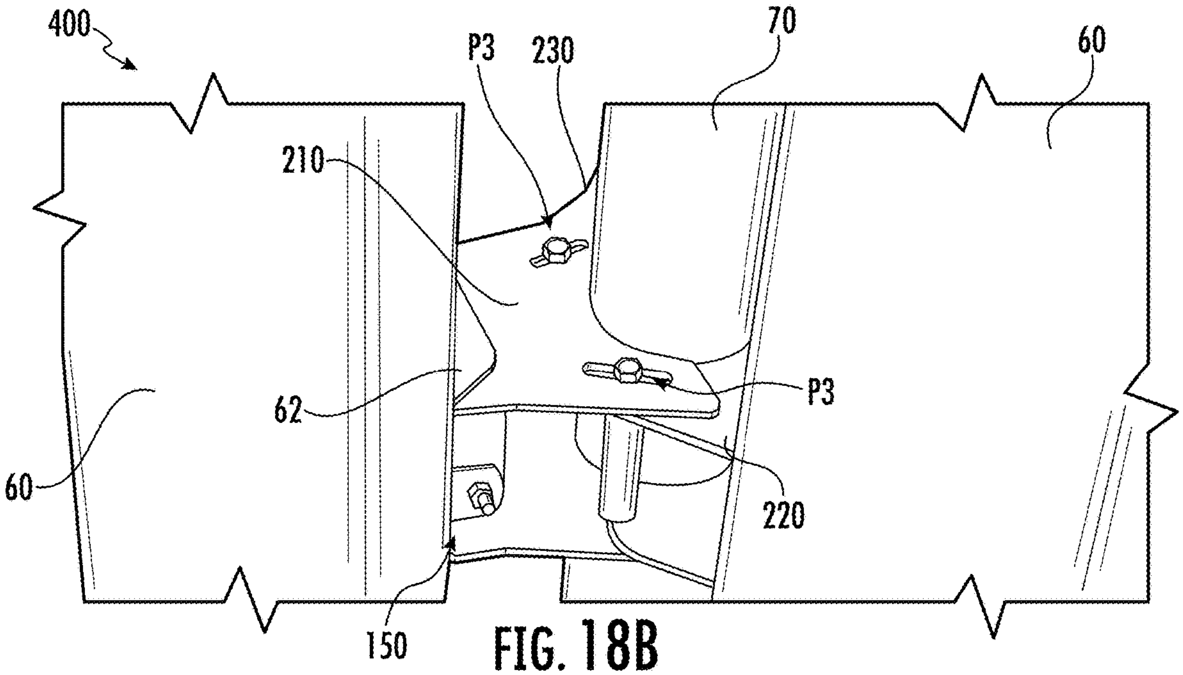
FIG. 18B is an enlarged perspective view of the assembly of FIG. 18A.

In some embodiments, the adjustable clamps 220, 230 may be secured together via fasteners 140 (e.g., nuts 142 and bolts 141), for example, when securing the mounting bracket 200 to a monopole 70 (see, e.g., FIGS. 17-18B). The base clamp 210 and adjustable clamps 220, 230 define a receiving space 205 for a monopole 70. The receiving space 205 of the mounting bracket 200 can be adjusted to accommodate monopoles 70 having different diameters based the on placement of the bolts 160 within respective indentations 212*i* in the slots 212*a*, 214*a* which correspond to a specific monopole diameter (i.e., 3.5 inch, 4 inch, 4.5 inch, 5 inch, or 5.5 inch) (see, e.g., FIG. 15C).

As noted above, the receiving space 205 of the mounting bracket 200 is adjustable to accommodate different sized (i.e., diameter) monopoles 70 therein. This can be accomplished by a user moving (e.g., sliding) the fasteners 160 to a corresponding indentation 212*i* within the slots 212*a*, 214 in the base clamp 200 to change the pivot points P3 of the adjustable clamps 220, 230 relative to the base clamp 210. For example, as shown in FIG. 14, the mounting bracket 200 is adjusted to accommodate a 3.5-inch diameter monopole 70. The fasteners 160 are received within the indentation 212*i* corresponding to a 3.5-inch diameter monopole 70 (as indicated by indicia 115) which provides a receiving space 205 sized to engage a monopole having a diameter of 3.5 inches (i.e., when the adjustable clamps 220, 230 are pivoted toward each other in a "closed" position). This can be compared with the mounting bracket 200' illustrated in FIG. 16, which is adjusted to accommodate a 5.5-inch diameter monopole 70. The fasteners 160 are moved (slid) within the slots 212*a*, 214*a* in the base clamp 210 to the indentation 212*i* corresponding to a 5.5-inch diameter monopole 70 which changes the corresponding pivot points P4 for the adjustable clamps 220, 230 relative to the base clamp 210 and provides a larger receiving space 205, thereby allowing the mounting bracket 200' to be secured to the larger 5.5-inch diameter monopole 70 (i.e., compared to the 3.5-inch diameter monopole 70).

FIG. 17 and FIGS. 18A-18B illustrate exemplary assemblies 300, 400 according to embodiments of the present invention showing the mounting bracket 200 of the present invention secured to a monopole 70 (FIG. 17) and two antennas 60 mounted to a monopole 70 utilizing the mounting bracket 200' of present invention (FIGS. 18A-18B).

Referring now to FIGS. 19-24C, another antenna mounting bracket 500 according to embodiments of the present invention. Similar to the mounting brackets 10, 100, 200 described herein, the mounting bracket 500 can enable a technician to install up to three antennas 60 to a monopole 70 with a single mounting bracket 500 (or with two mounting brackets 500 if both upper and lower mounting points are desired for each antenna 60, see, e.g., FIGS. 24A-24C). In the addition, as described in further detail below, the mounting bracket 500 can be adjustable to accommodate multiple monopole diameters. This can both simplify the mounting process and can reduced manufacturing costs, as fewer parts are required.

Figure 19A:
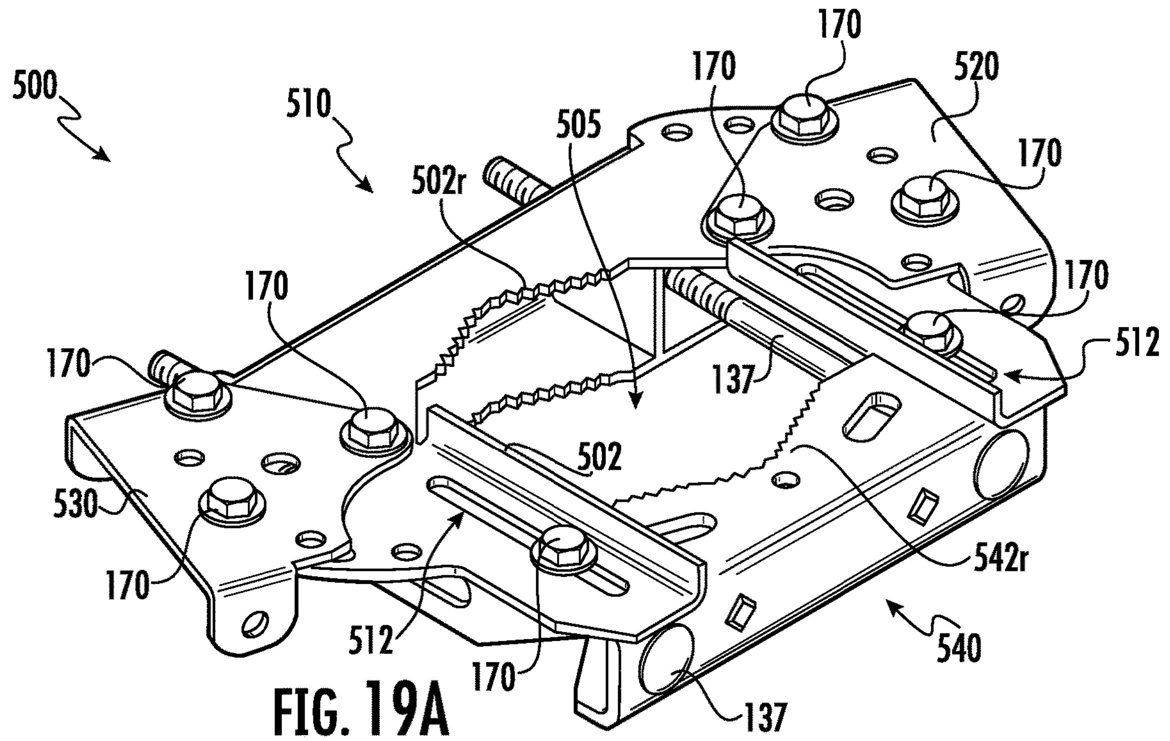
FIG. 19A is a top front perspective view of another antenna mounting bracket according to embodiments of the present invention.
Figure 19B:
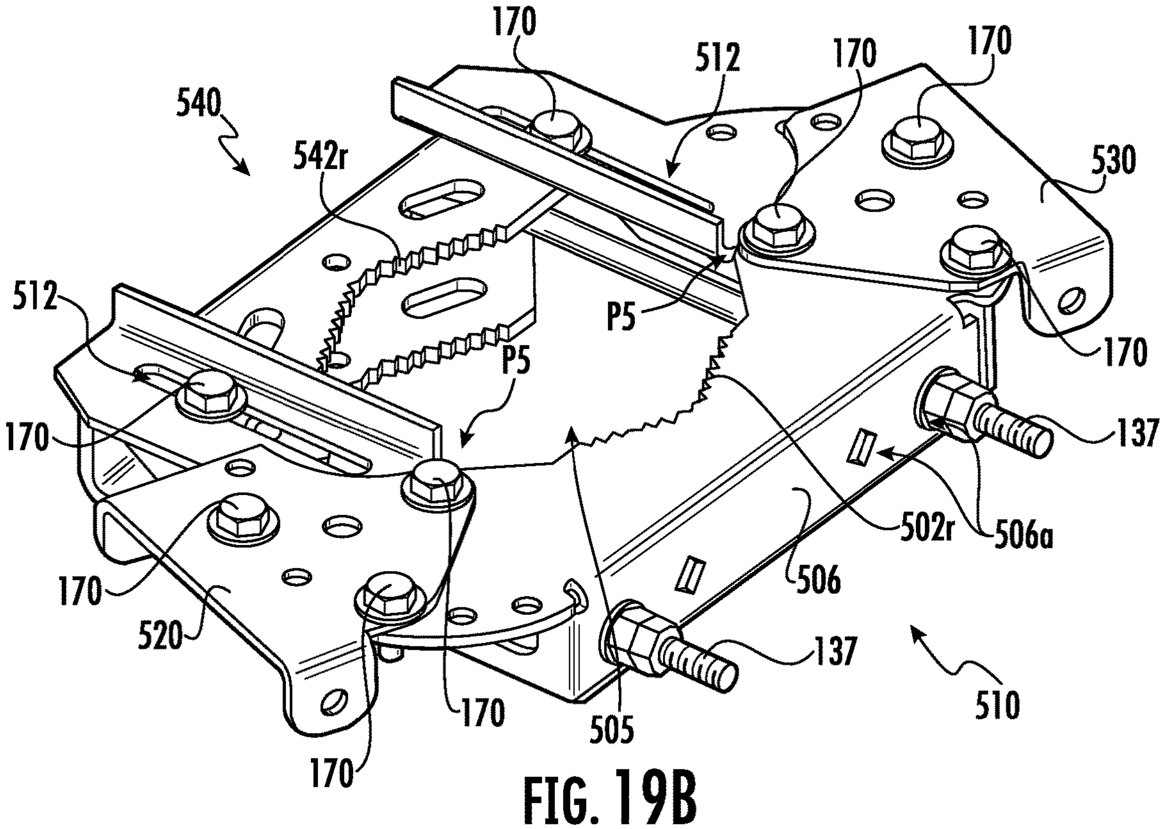
FIG. 19B is a top rear perspective view of the mounting bracket of FIG. 19A.

Referring to FIGS. 19A and 19B, the mounting bracket 500 according to embodiments of the present invention is illustrated. As shown in FIGS. 19A and 19B, the mounting bracket 500 includes a base member 510 and a clamping member 540. The base member 510 and the clamping member 540 create a receiving space 505. The base member 510 includes a first adjustment plate 520 and a second adjustment plate 530 (see also, e.g., FIGS. 20A-20B and FIGS. 22A-22B). These structures are described in greater detail below.

Figure 20A:
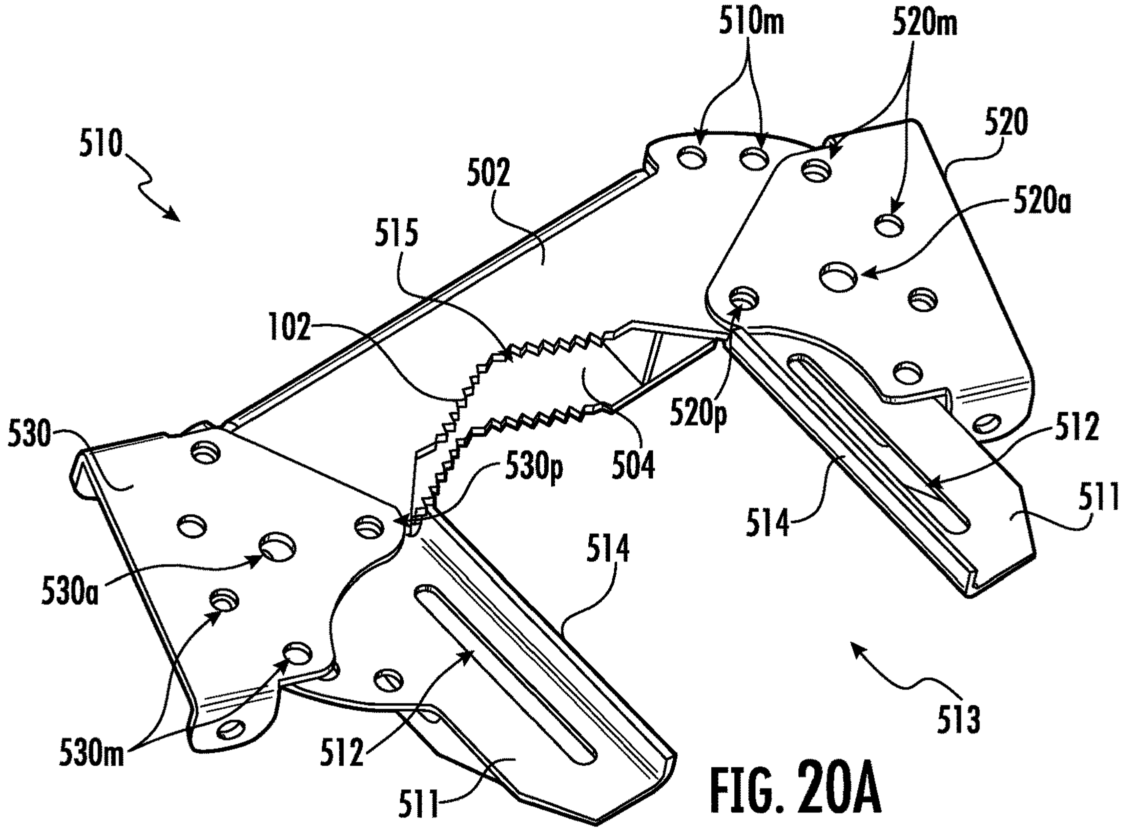
FIG. 20A is a top perspective view of the base member and adjustment plates of the mounting bracket of FIG. 19.
Figure 20B:
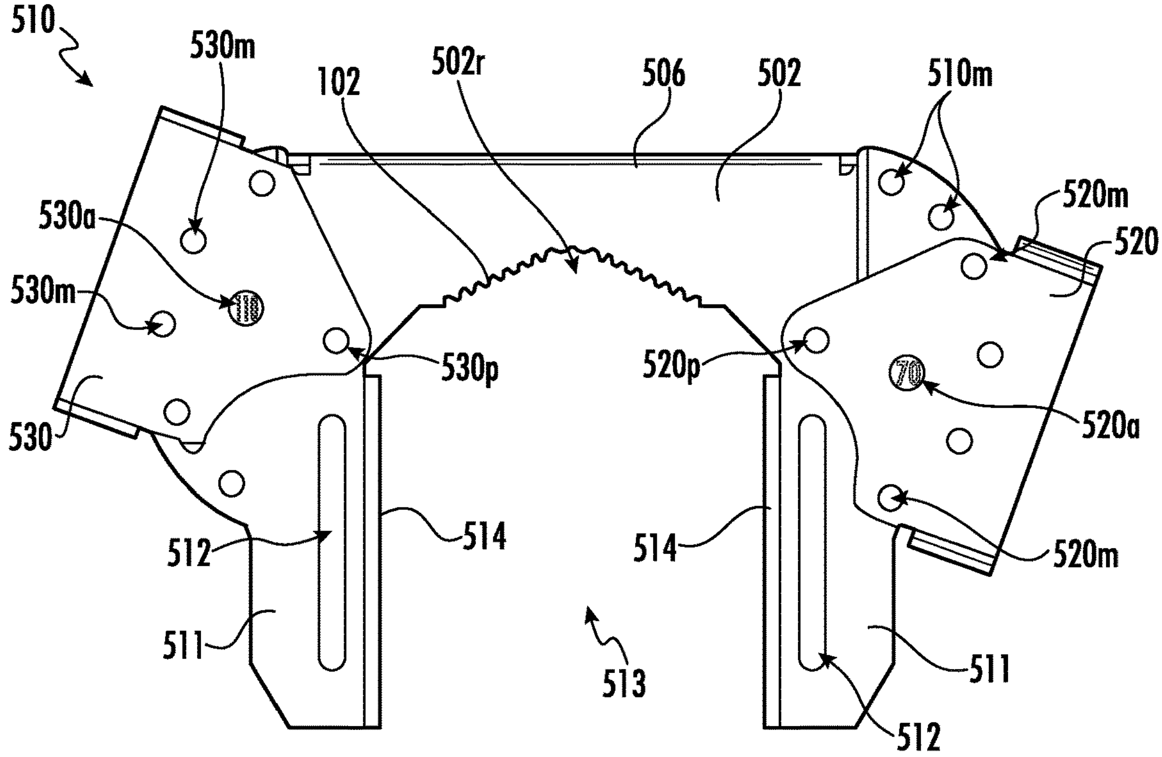
FIG. 20B is a top view of the base member and adjustment plates of FIG. 20A.
Figure 20C:
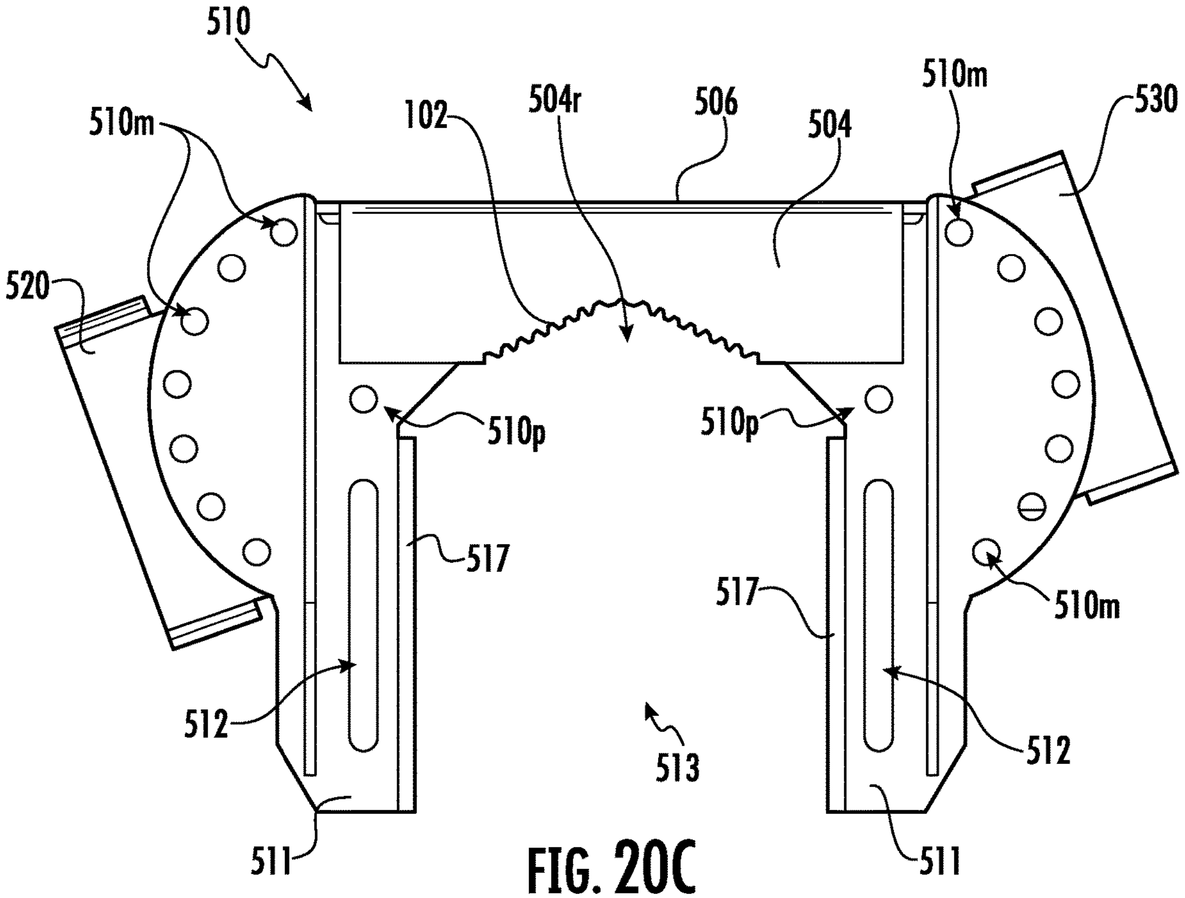
FIG. 20C is a bottom view of the base member and adjustment plates of FIG. 20A.
Figure 20D:
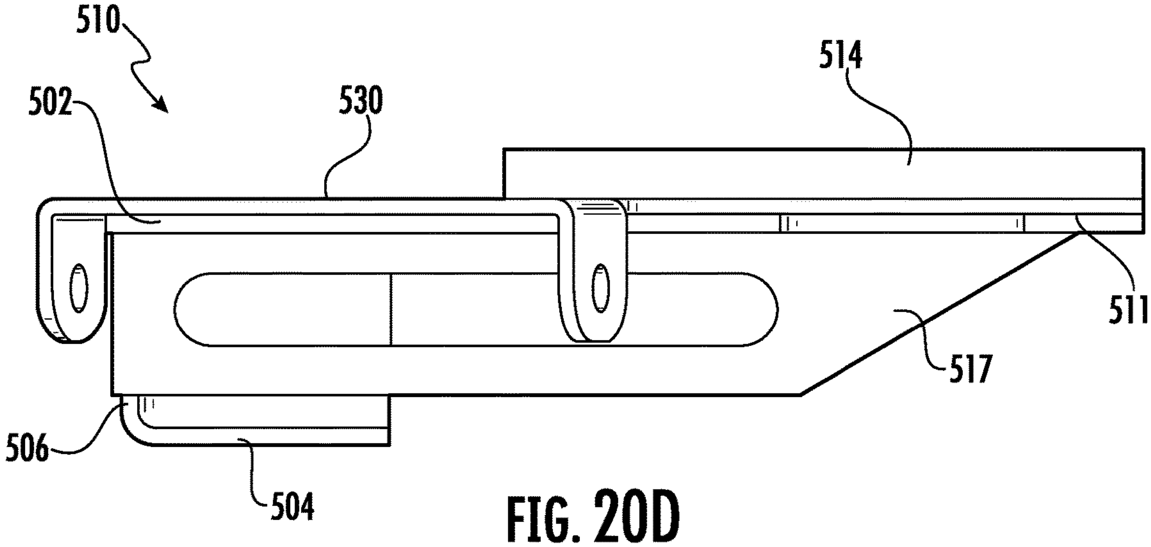
FIG. 20D is a side view of the base member and one adjustment plate of FIG. 20A.

Referring to FIGS. 20A-20D, the base member 510 has two legs 511 that are connected or coupled together at one end by an upper plate 502 to create a base member receiving space 513. The base member receiving space 513 forms part of the receiving space 505 of the mounting bracket 500. An inner edge of each leg 511 (i.e., adjacent to the base member receiving space 513) has a flanged edge 514 that extends upwardly from each leg 511. In some embodiments, the base member 510 may also comprise opposing side walls 517 that extend downwardly from each leg 511 (see, e.g., FIG. 20D). As shown in FIGS. 20A-20C, each leg 511 also comprises an oblong or elongated slot 512. As discussed in further detail below, each slot 512 is configured to receive a respective fastener 170 that secures the clamping member 540 to the base member 510. The fasteners 170 are configured to traverse within the slots 512 which allows the clamp member 540 to move relative to the base member 510 to adjust the receiving space 513 of the mounting bracket 500 to accommodate different sized (i.e., diameter) monopoles 70 therein.

The base member 510 also comprises a lower plate 504. A spine 506 extends between a rear end of each plate 502, 504 and couples the upper and lower plates 502, 504 together. In some embodiments, the side walls 517 of the base member 510 may extend to the upper and lower plates 502, 504 (see, e.g., FIG. 20D). As shown in FIG. 19B, the spine 506 includes a plurality of apertures 506*a*. In some embodiments, two of the apertures 506*a* in the spine 506 are configured to receive respective fasteners 137 to secure the clamping member 540 to the base member 510 (see, e.g., FIGS. 19A-19B). In some embodiments, two of the apertures 506*a* in the spine 506 are configured to receive fasteners 150 to secure a complementary bracket 62 of the antenna 60 to the mounting bracket 500 (see, e.g., FIGS. 24A-24C). In some embodiments, the base clamp 510 may be formed from a single piece of material (e.g., steel) that is bent to form the spine 506 and the upper and lower plates 502, 504.

At an opposing front end of each plate 502, 504 (i.e., opposite the spine 506) resides a concave edge or upper and lower recess 502*r*, 504*r*. The upper and lower recesses 502*r*, 504*r* are configured to receive a portion of the monopole 70 and form a segment of the receiving space 513. In some embodiments, each recess 502*r*, 504*r* has a plurality of protrusions or teeth 102 that extend radially inwardly into the respective recess 502*r*, 504*r*. The teeth 102 of the upper and lower plates 502, 504 help to provide grip on the monopole 70.

The upper plate 502 of the base member 510 also comprises a plurality of apertures 510*p*, 510*m*. As shown in FIGS. 19A-19B, the apertures 510*p*, 510*m* in the upper plate 502 correspond with apertures 520*p*, 530*p*, 520*m*, 530*m* in the first and second adjustment plates 520, 530. The apertures 520*p*, 530*p*, 520*m*, 530*m* are configured to receive respective fasteners 170 to secure the adjustment plates 520, 530 to the base member 510 (see also, e.g., FIGS. 22A-22B). In some embodiments, two of the apertures 510*p* may provide pivot points P5 for the first and second adjustment plates 520, 530 (i.e., relative to the base member 510). As discussed in further detail below, in some embodiments, the other apertures 510*m* in the base member 510 are for securing the first and second adjustment plates 520, 530 at a desired position (e.g., angle) relative to the base member 510, for example, a desired position or direction of a mounted antenna 60 (see, e.g., FIGS. 24A-24C). In some embodiments, the base member 510 further comprises indicia 115 that corresponds to the position or angle of the adjustment plates 520, 530 relative to the base member 510 (see, e.g., FIG. 22B).

Figure 21:
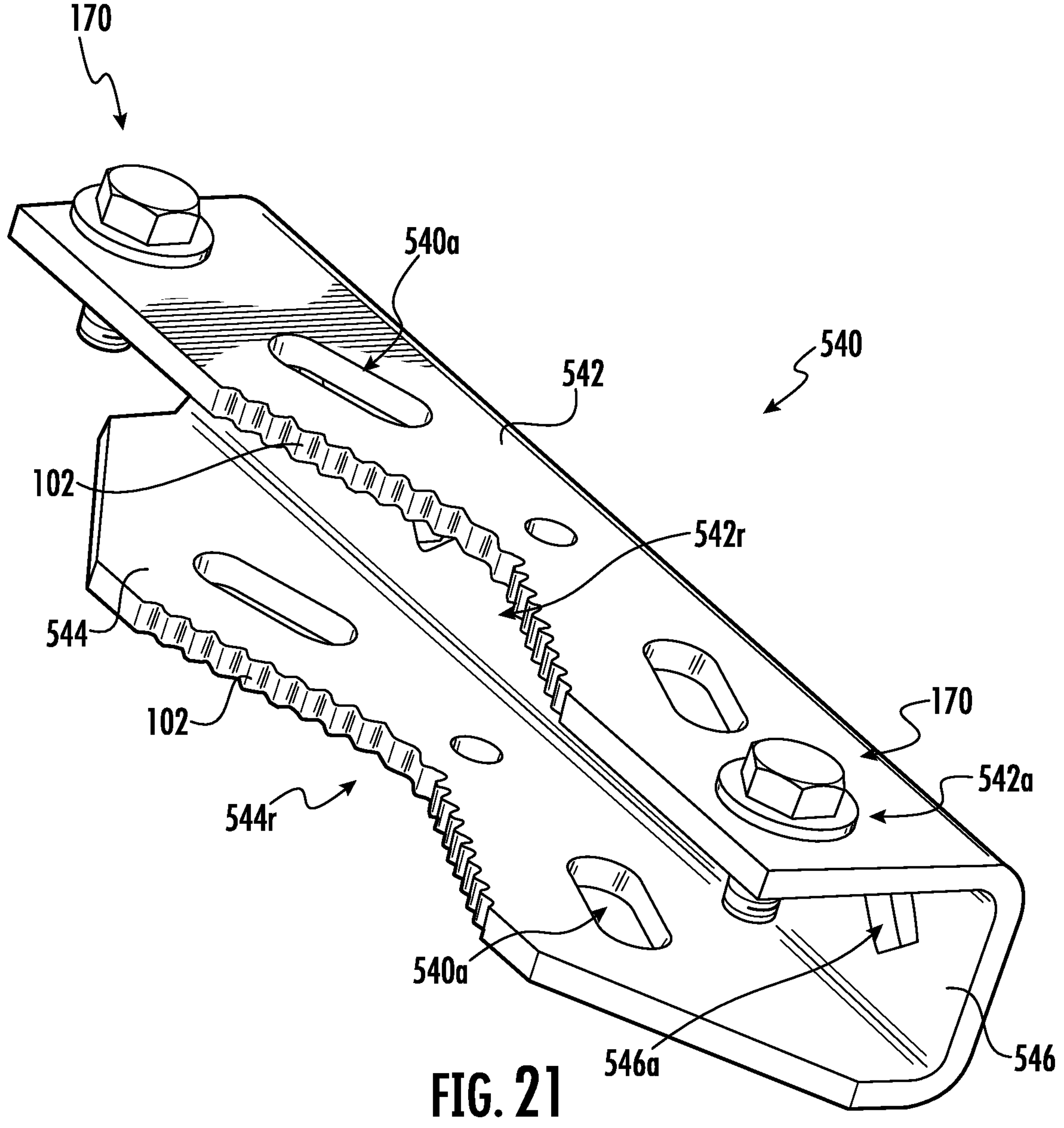
FIG. 21 is a front perspective view of the clamping member of the mounting bracket of FIG. 19.

Referring to FIG. 21, the clamping member 540 of the mounting bracket 500 is illustrated, and will be described in further detail below. As shown in FIGS. 21, the clamping member 540 has an upper plate 542 and a lower plate 544. A spine 546 extends between a rear end of each plate 542, 544 and couples the upper and lower plates 542, 544 together. In some embodiments, the clamping member 540 may be formed from a single piece of material (e.g., steel) that is bent to form the spine 546 and the upper and lower plates 542, 544. The upper plate 542 comprises a pair of apertures 542*a*. Each aperture 542*a* is configured to receive a respective fastener 170 that secures the clamping member 540 to the legs 511 of the base member 510 via the slots 512. As discussed above, the fasteners 170 are configured to traverse within the slots 512 which allows the clamping member 540 to move (e.g., slide) relative to the base member 510 to secure the mounting bracket 500 to a monopole 70, and thus, allowing the mounting bracket 500 to be adjustable to different diameter monopoles 70. In some embodiments, the upper and lower plates 542, 544 of the clamping member 540 may comprise additional apertures 540*a* which help to reduce the overall weight of the mounting bracket 500 and may also allow the clamping member 540 to be more easily adjusted.

At an opposing front end of each plate 542, 544 (i.e., opposite the spine 546) resides a concave edge or upper and lower recess 542*r*, 544*r*. The upper and lower recesses 542*r*, 544*r* are configured to receive a portion of the monopole 70 and form a segment of the receiving space 505. In some embodiments, each recess 542*r*, 544*r* has a plurality of protrusions or teeth 102 that extend radially inwardly into the respective recess 542*r*, 544*r*. The teeth 102 of the upper and lower plates 542, 544 help to provide grip on the monopole 70.

Figure 22A:
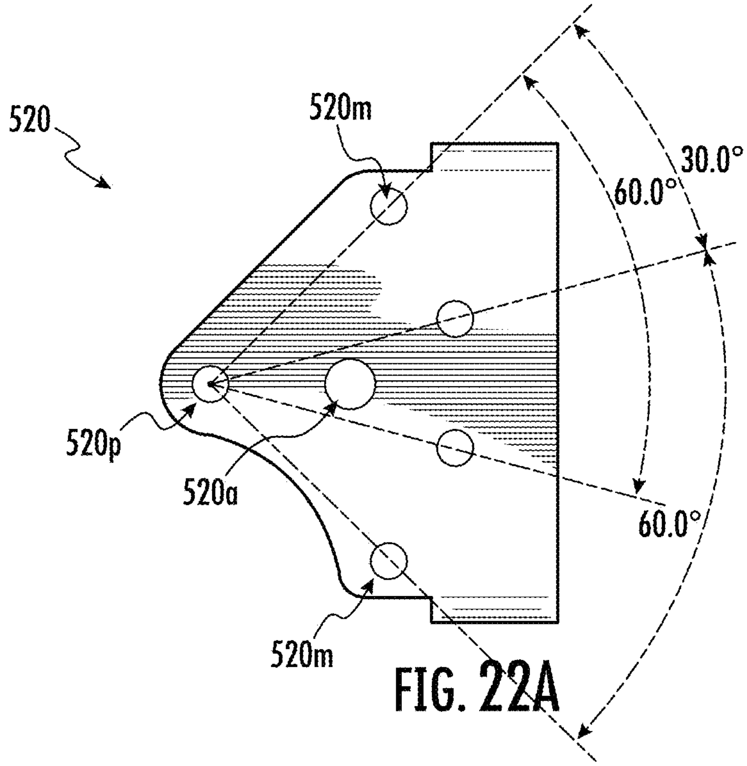
FIG. 22A is a top view of one of the adjustment plates of the mounting bracket of FIG. 19.
Figure 22B:
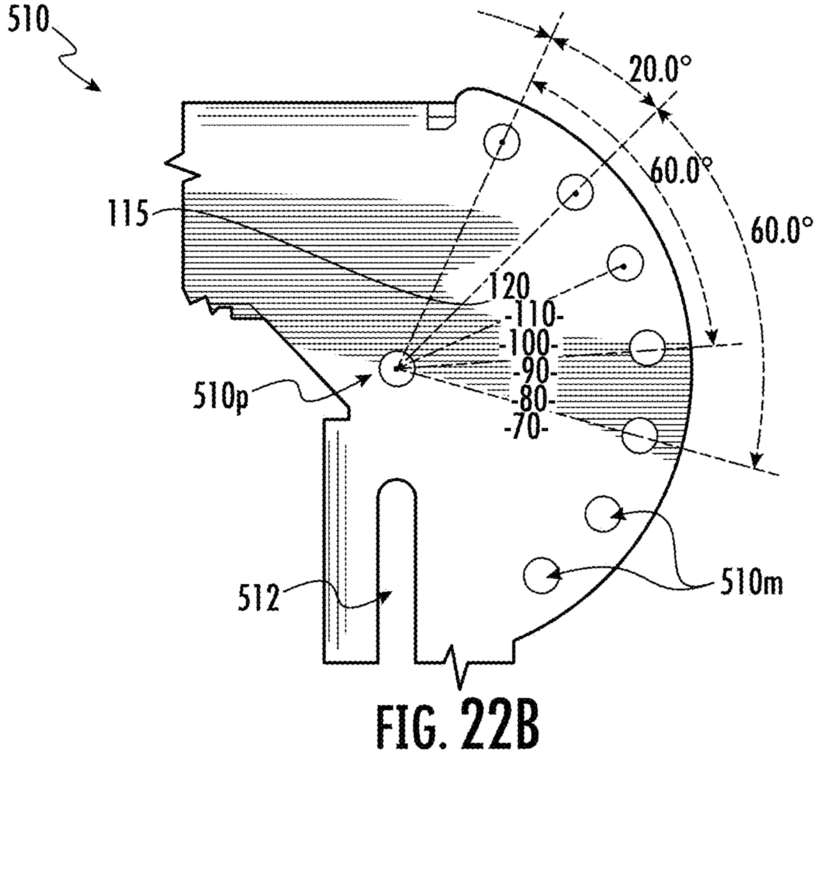
FIG. 22B is a partial top view of the base member of the mounting bracket of FIG. 19.
Figure 23:
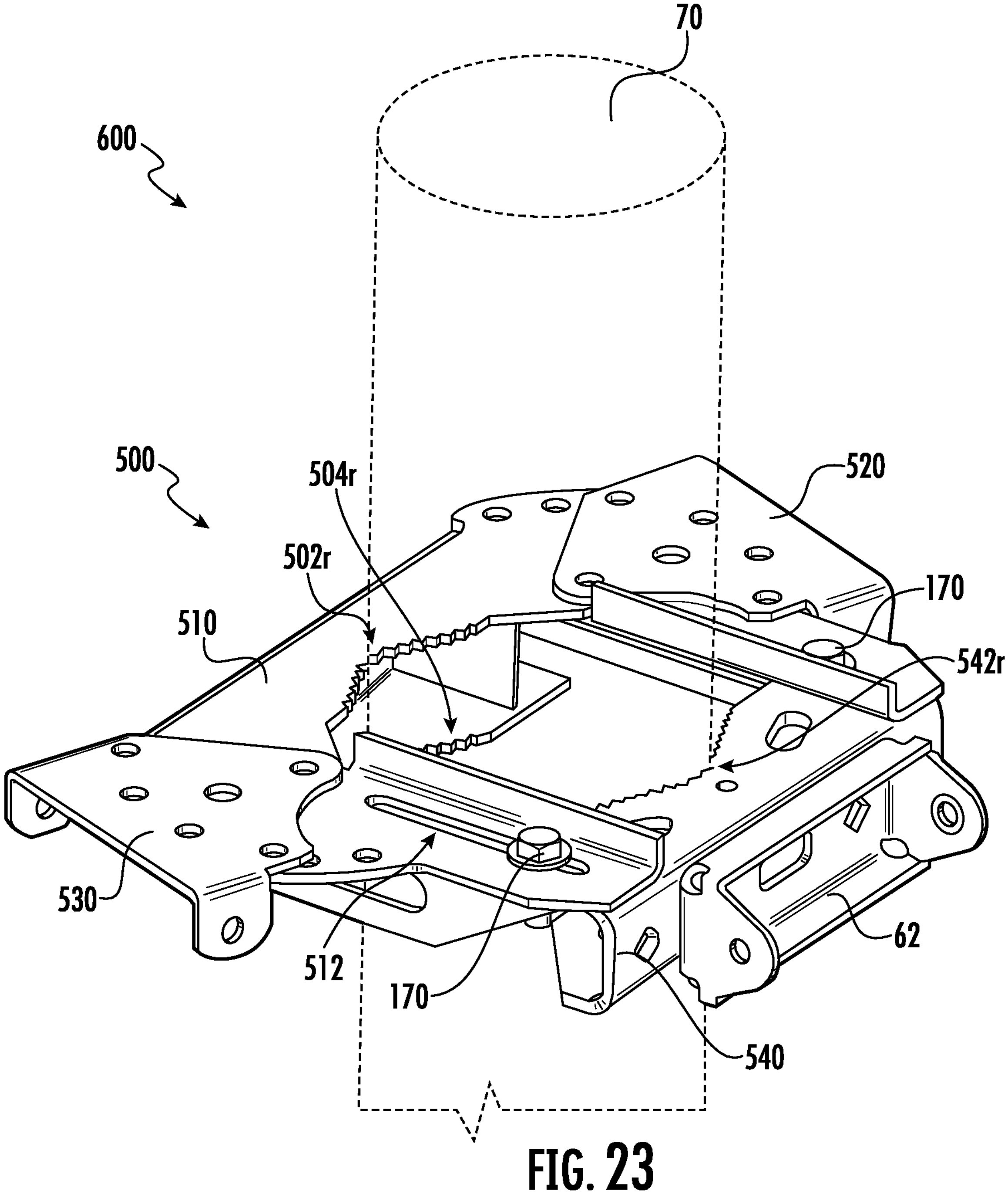
FIG. 23 is a top perspective view of the mounting bracket of FIG. 19 secured to a monopole according to embodiments of the present invention.

Referring to FIGS. 22A-22B, one of the adjustment plates 520 (FIG. 22A) and a partial view of the base member 510 (i.e., a segment of the base member 510 which one of the adjustment plates is secured) (FIG. 22B) are illustrated. As shown in FIG. 22A, the adjustment plate 520 has a plurality of apertures 520*a*, 520*p*, 520*m*. It is noted that while only one of the adjustment plates 520 is illustrated, the other adjustment plate 530 has the same or similar features. For example, the other adjustment plate 530 also has a plurality of similar apertures 530*a*, 530*p*, 530*m* (see, e.g., FIGS. 20A-20B). As noted above, one of the apertures 520*p*, 530*p* aligns with a corresponding aperture 510*p* in the base member 510 and is configured to receive a fastener 170 therethrough. The fasteners 170 received through the apertures 520*p*, 510*p* allow the adjustment plate 520 to pivot relative to the base member 510 (e.g., about pivot point P5). Another aperture 520*a* in the adjustment plate 520 aligns with indicia 115 on the base member 510 and allows a technician to see the position (or angle) of the adjustment plate 520, 530 relative to the base member 510. The technician may then insert additional fasteners 170 through mounting apertures 520*m* (which are aligned with apertures 510*m* in the base member 510) to secure the respective adjustment plate 520, 530 at the desired position (or angle) relative to the base member 510 (see also, e.g., FIGS. 19A-19B). In some embodiments, other ways of indicating alignment may be used, for example, the upper plate 502 of the base member 510 may have labelled lines that align with an edge of the respective adjustment plates 520, 530 as the plate(s) rotate relative to the base member 510

In some embodiments, the rotating angle ($\alpha$) of the adjustment plates 520, 530 is in the range of between about every 5 degrees and about every 20 degrees. FIGS. 22A-22B illustrate an exemplary configuration (spacing) of the mounting apertures 520*m* in the adjustment plate 520. It is noted that while only adjustment plate 520 is shown in FIG. 22A, the mounting apertures 530*m* in adjustment plate 530 may have the same or similar configuration. As shown in FIGS. 22A-22B (and FIGS. 20A-20B), in some embodiments, the adjustment plates 520, 530 may have four (4) mounting apertures 520*m*, 530*m* with each mounting aperture 520*m*, 530*m* being positioned (spaced) every 30 degrees. In some embodiments, the base member 510 has fourteen (14) mounting apertures 510*m* (or seven (7) mounting apertures 510*m* per adjustment plate 520, 530) with each the mounting aperture 510*m* being positioned (spaced) every 20 degrees. The spacing between the respective mounting apertures 510*m*, 520*m*, 530*m* in the base member 510 and adjustment plates 520, 530 allow the adjustment plates 520*m*, 530*m* to provide different positions or rotating angles ($\alpha$) for an antenna 60 to be mounted on the mounting bracket 500. Thus, when the adjustment plates 520, 530 work together with the base member 510, the adjustment plates 520, 530 can be adjusted every 10 degrees relative to the base member 510 (i.e., the rotating angle ($\alpha$)). Similarly, if the mounting apertures 510*m* on the base member 510 are positioned every 10 degrees and the mounting apertures 520*m*, 530*m* on the adjustment plates 520, 530 are positioned every 15 degrees, then the adjustment plates 520, 530 can be adjusted every 5 degrees relative to the base member 510. Therefore, the mounting bracket 500 can be designed with different angle groups to allow the adjustment plates 520, 530 to have different rotating intervals, i.e., the rotating angles (α). This also allows for greater spacing between the mounting apertures 520*m*, 530*m* in the adjustment plates 520, 530 such that the mounting bracket 500 can maintain structural strength, while also allowing for smaller rotating intervals.

It is noted that each adjustment plate 520, 530 may be rotated relative to the base member 510 independently from the other adjustment plate 520, 530. For example, if an antenna 60 is to be secured to each adjustment plate 520, 530 of the mounting bracket 500 and the antennas 60 need to be positioned 180 degrees from each other (see, e.g., FIG. 20C), a technician can secure the mounting bracket 500 to the monopole 70, then adjust the angle (α) of the antennas 60 (i.e., the adjustment plates 520, 530) without having to adjust the mounting bracket 500 on the monopole 70.

Figure 24A:
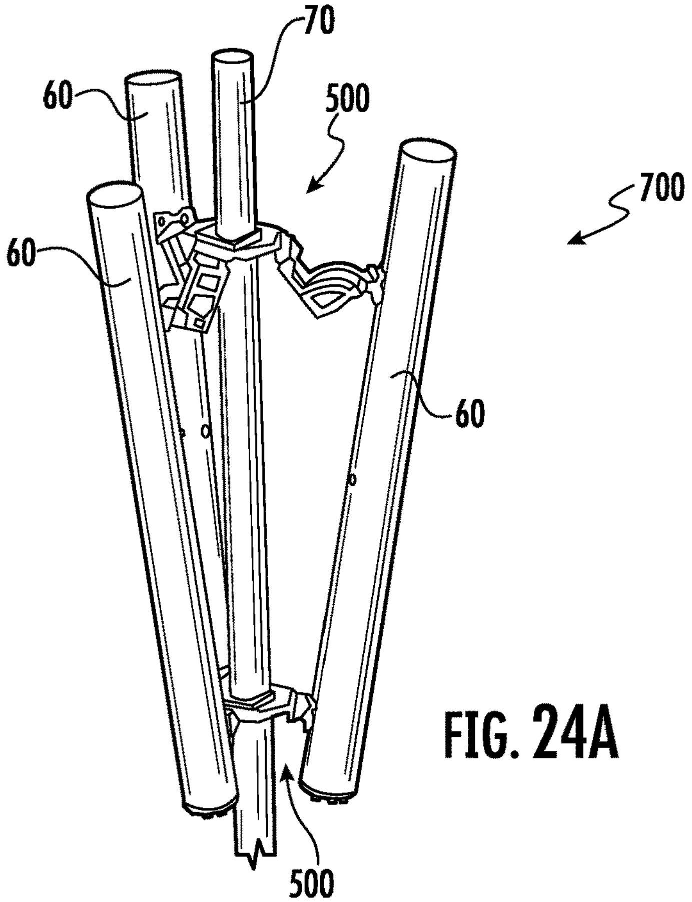
FIG. 24A is a bottom perspective view of an antenna mounting bracket assembly having three antennas mounted to a monopole utilizing the antenna mounting bracket of FIG. 19 according to embodiments of the present invention.
Figure 24B:
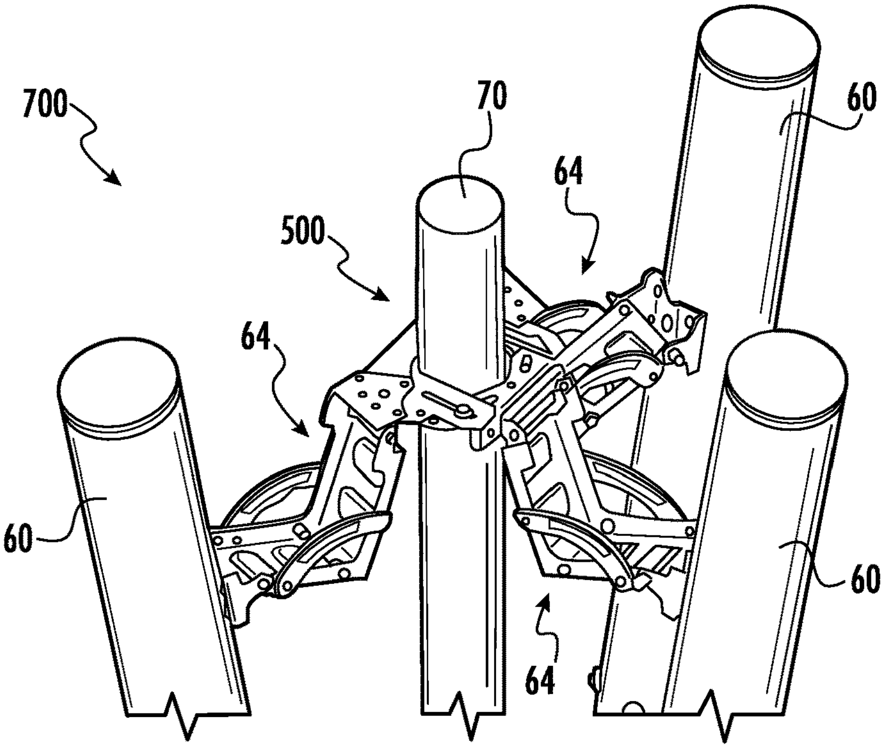
FIG. 24B is an enlarged partial view of the antenna mounting bracket assembly of FIG. 24A.
Figure 24C:
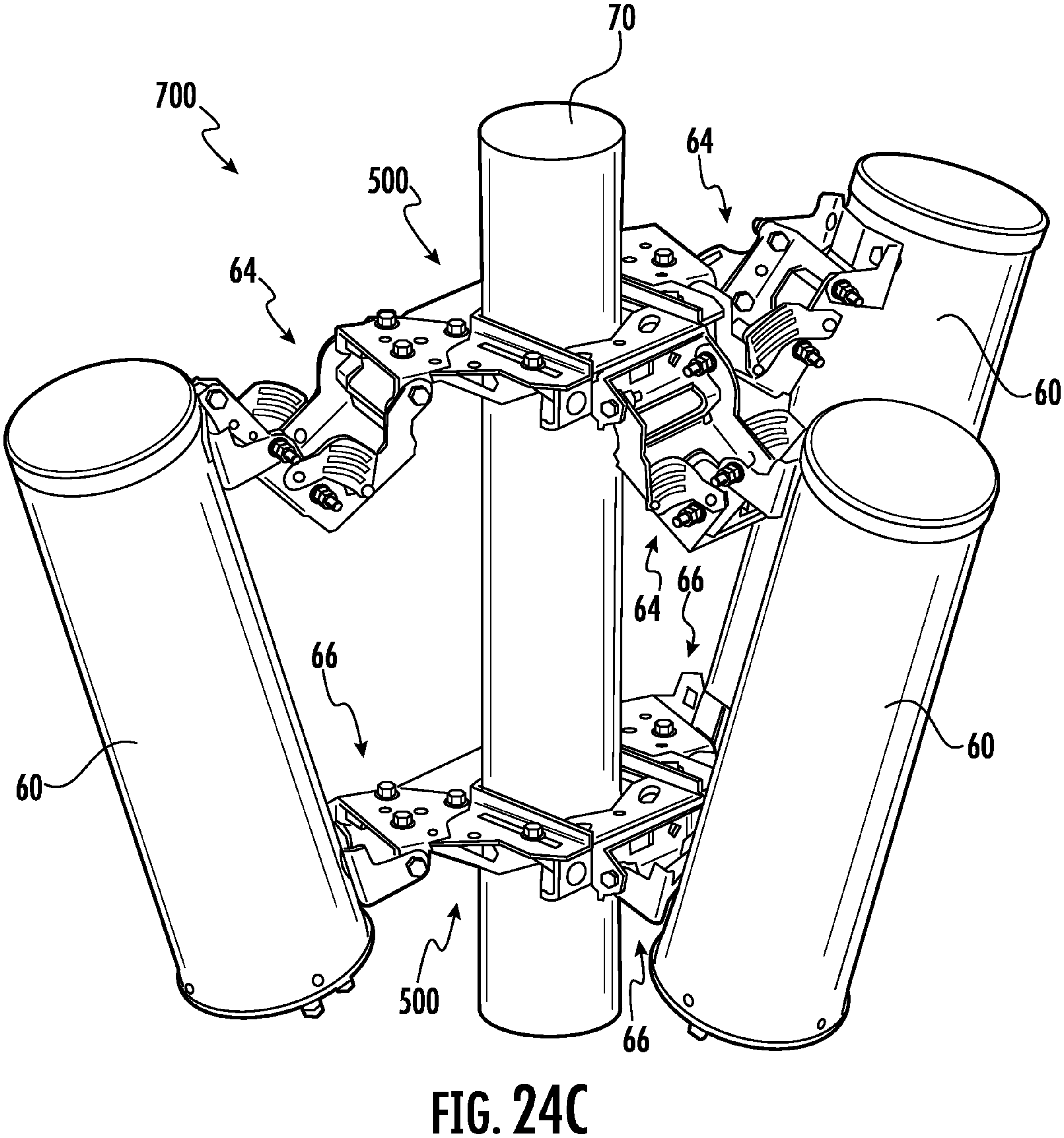
FIG. 24C is a top perspective view of the antenna mounting bracket assembly of FIG. 24A.

FIG. 23 and FIGS. 24A-24C illustrate exemplary assemblies 600, 700 according to embodiments of the present invention showing the mounting bracket 500 of the present invention secured to a monopole 70 (FIG. 23) and three antennas 60 mounted to a monopole 70 utilizing the mounting bracket 500 of present invention (FIGS. 24A-24C).

In use, to secure the mounting bracket 500 to a monopole 60, first the monopole 60 is positioned between the legs 511 of the base member 510 and received within the receiving space 513 of the base member 510. The clamping member 540 is next mounted to the base member 510 via fasteners 170 received through the slots 512 in the legs 511 of the base member 510 and apertures 542*a* in the upper plate 542 of the clamping member 540. The clamping member 540 is moved (slid) relative to the base member 510 (i.e., the fasteners 170 traverse within the slots 512) to engage the monopole 60 and secure the monopole 60 between the base member 510 and the clamping member 540 (i.e., the monopole 60 is secured within the respective recesses 502*r*, 504*r*, 542*r*, 544*r* of the base member 510 and clamping member 540 and gripped by teeth 102). The mounting bracket 500 may then be secured to the monopole 60 via fasteners 137 extending through the apertures 506*a*, 546*a* in the spines 506, 546 of the base member 510 and the clamping member 540.

Next, the adjustment plates 520, 530 may be pivoted relative to the base member 510 (i.e., about pivot points P5) to the desired rotating angles (α) that the corresponding antennas 60 are to be positioned. One, two, or three antennas 60 may then be secured to the adjustment plates 520, 530 and/or clamping member 540 of the mounting bracket 500 using complementary brackets 62 of the antennas 60 (see, e.g., FIGS. 24A-24C). It can be seen that the mounting bracket 500 can enable a technician to install three antennas 60 to a monopole 70 with a single mounting bracket 500 (or with two mounting brackets 500 if both upper and lower mounting points are desired for each antenna 60 as in FIGS. 24A and 24C). This can both simplify the mounting process and can reduced manufacturing costs, as fewer parts are required.

It should also be noted that, although simple brackets 62 may be illustrated herein for attaching the mounting bracket 500 to an antenna 60, as shown in FIGS. 24A-24C, other mechanisms for attaching the antenna 60 may be employed, including mounting bracket systems 64, 66 that enable an antenna to be deployed with an adjustable degree of downtilt.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A mounting bracket for an antenna, the mounting bracket comprising:
- a base plate having first and second arms and a spine spanning the first and second arms, the first and second arms and spine creating a monopole receiving space, wherein first, second and third flanges merge with and extend downwardly from, respectively, the first arm, the second arm, and the spine, each of the first, second and third flanges including first and second radially-outwardly extending ears; and
- a clamp comprising first and second jaws, each of the first and second jaws having upper and lower plates spanned by a backbone, the clamp further comprising first and second elongate threaded members that extend between the backbones of the first and second jaws;
- wherein each of the first and second jaws is attached to each of the first and second arms via fasteners inserted through apertures in the first and second arms.

2. The mounting bracket defined in claim 1, wherein the apertures in the first and second arms are slots.

3. The mounting bracket defined in claim 2, wherein the slots in the first and second arms comprises two slots in each of the first and second arms.

4. The mounting bracket defined in claim 3, wherein the slots in the first arm are collinear, and the slots in the second arm are collinear.

5. The mounting bracket defined in claim 1, wherein each of the upper and lower plates of the first and second jaws includes a toothed concave edge.

6. The mounting bracket defined in claim 1, wherein the first, second and third flanges are arranged to be substantially circumferentially equidistant from each other.

7. The mounting bracket defined in claim 1, in combination with first, second and third antennas mounted to, respectively, the first and second ears of the first, second and third flanges.

8. The mounting bracket defined in claim 7, wherein the combination of the mounting bracket and the first, second, and third antennas is in further combination with a monopole, the first and second jaws engaging the monopole.

9. A mounting bracket for an antenna, the mounting bracket comprising:
- a base plate defining a monopole receiving space, wherein first, second and third flanges merge with and extend downwardly from the base plate, each of the first, second and third flanges including first and second radially-outwardly extending ears; and
- a clamp comprising first and second jaws, each of the first and second jaws having upper and lower plates spanned by a backbone, the clamp further comprising first and second elongate threaded members that extend between the backbones of the first and second jaws;
- wherein each of the first and second jaws is attached to the base plate via fasteners inserted through apertures in the base plate.

10. The mounting bracket defined in claim 9, wherein the base plate has first and second arms and a spine spanning the first and second arms.

11. The mount bracket defined in claim 10, wherein the first, second, and third flanges extend downwardly from the first arm, the second arm, and the spine, respectively.

12. The mount bracket defined in claim 9, wherein the first and second arms comprise apertures, and wherein the first and second jaws of the clamp are attached to each of the first and second arms via fasteners inserted through respective apertures.

13. The mounting bracket defined in claim 9, wherein the apertures in the base plate are slots.

14. The mounting bracket defined in claim 12, wherein the apertures in the first and second arms comprise two slots in each of the first and second arms.

15. The mounting bracket defined in claim 14, wherein the slots in the first arm are collinear, and the slots in the second arm are collinear.

16. The mounting bracket defined in claim 9, wherein each of the upper and lower plates of the first and second jaws includes a toothed concave edge.

17. The mounting bracket defined in claim 9, wherein the first, second and third flanges are arranged to be substantially circumferentially equidistant from each other.

18. The mounting bracket defined in claim 9, in combination with first, second and third antennas mounted to, respectively, the first and second ears of the first, second and third flanges.

19. The mounting bracket defined in claim 18, wherein the combination of the mounting bracket and the first, second, and third antennas is in further combination with a monopole, the first and second jaws engaging the monopole.

20. An antenna assembly, the antenna assembly comprising:

a monopole;

a first antenna, a second antenna, and a third antenna; and a mounting bracket assembly, the mounting bracket assembly comprising:

a base plate defining a monopole receiving space, wherein first, second and third flanges merge with and extend downwardly from the base plate, each of the first, second and third flanges including first and second radially-outwardly extending ears; and a clamp comprising first and second jaws, each of the first and second jaws having upper and lower plates spanned by a backbone, the clamp further comprising first and second elongate threaded members that extend between the backbones of the first and second jaws;

wherein each of the first and second jaws is attached to the base plate via fasteners inserted through apertures in the base plate, wherein the first, second and third antennas are mounted to the first and second ears of the first, second and third flanges of the mounting bracket assembly respectively, and wherein the first and second jaws of the clamp are engaged with the monopole.

* * * * *